April 21, 1964
T. P. LEWIS ETAL
3,130,104
APPARATUS FOR CONTINUOUSLY MANUFACTURING
FIBER REINFORCED PLASTIC PIPE
Filed Oct. 2, 1961
11 Sheets-Sheet 1
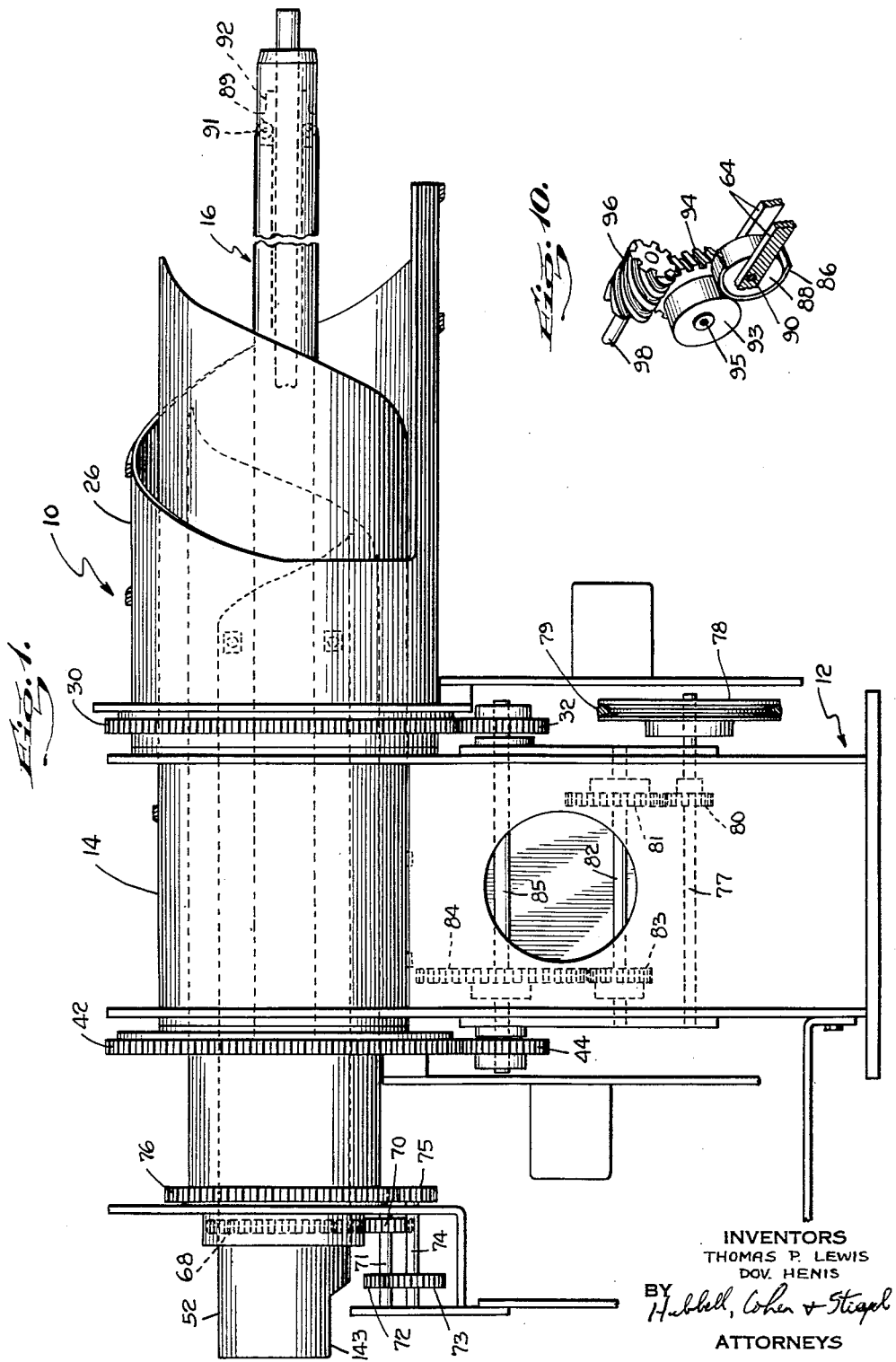
INVENTORS
THOMAS P. LEWIS
DOV. HENIS
BY *Hubbell, Cohen & Stiefel*
ATTORNEYS

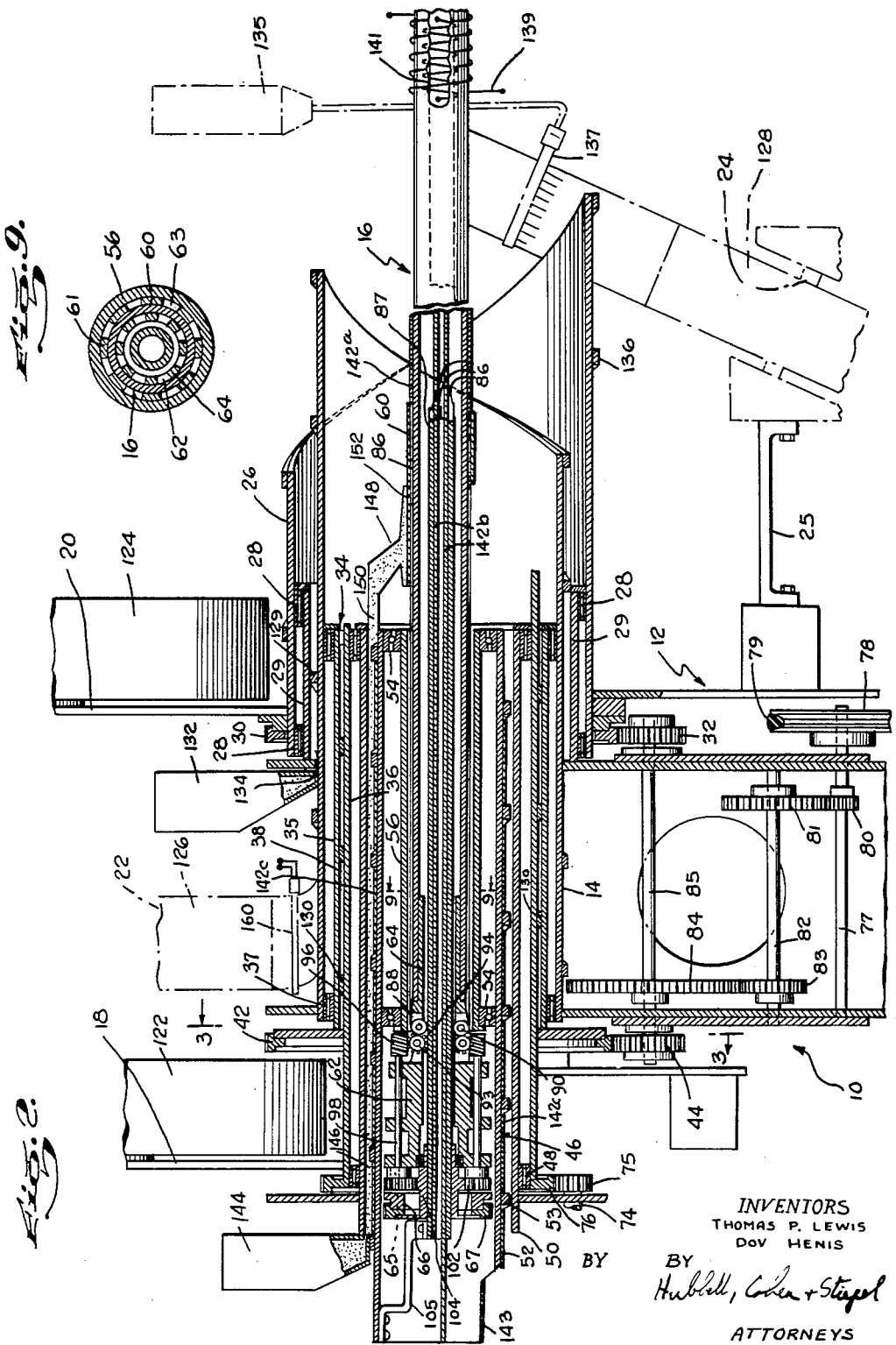

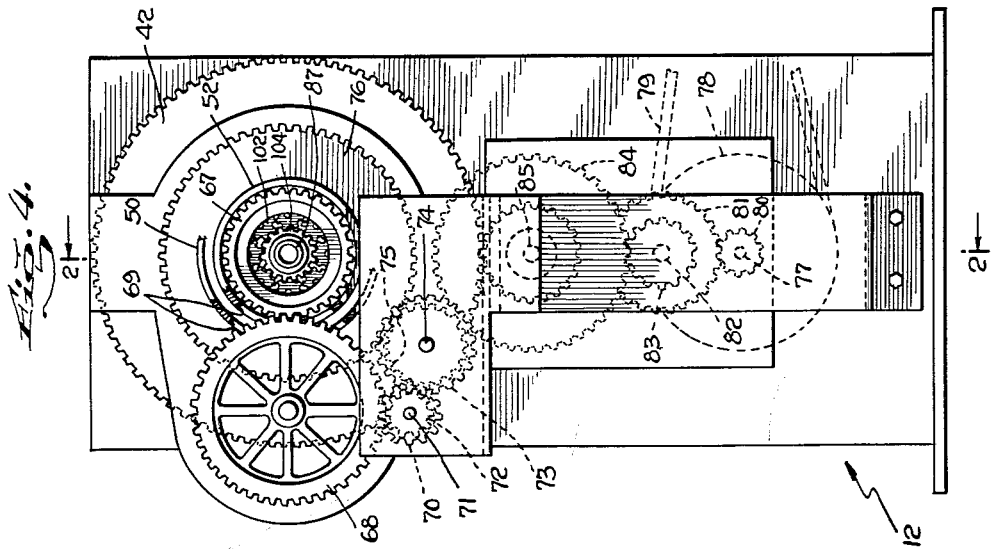
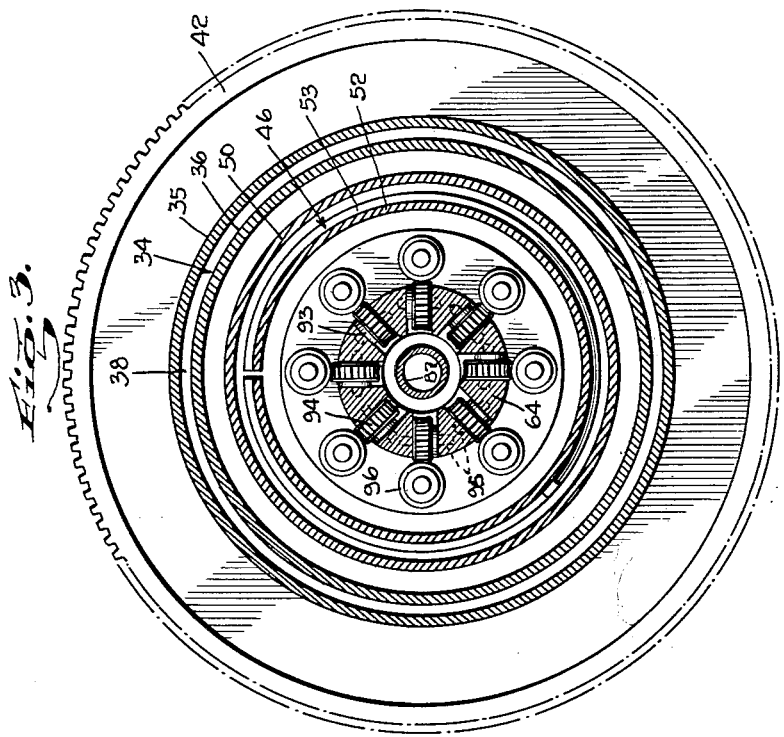

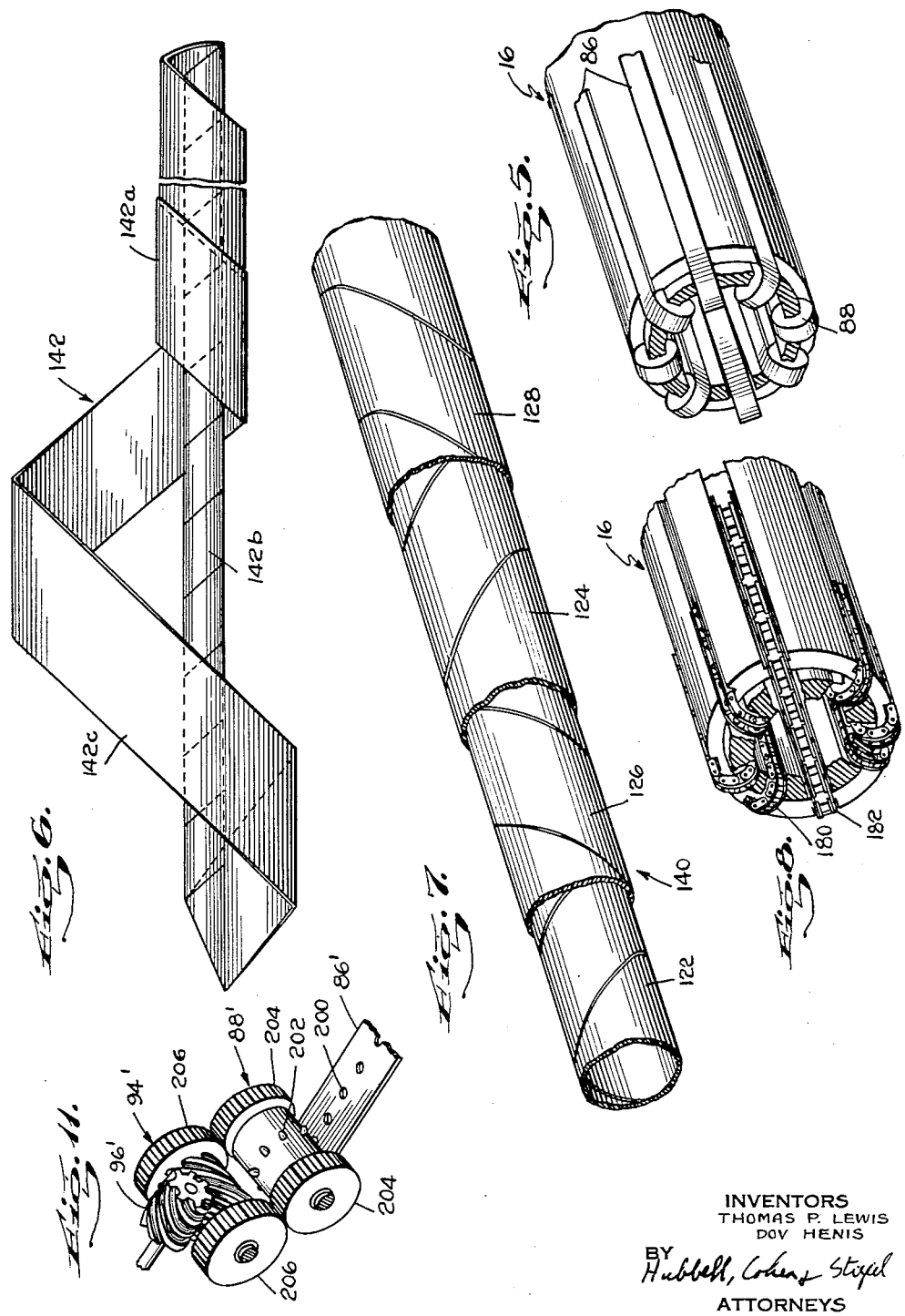

April 21, 1964

T. P. LEWIS ETAL 3,130,104

APPARATUS FOR CONTINUOUSLY MANUFACTURING
FIBER REINFORCED PLASTIC PIPE

Filed Oct. 2, 1961

INVENTORS
THOMAS P. LEWIS
DOV HENIS
BY
Hubbell, Cohen & Stiefel
ATTORNEYS.

April 21, 1964  T. P. LEWIS ETAL  3,130,104
APPARATUS FOR CONTINUOUSLY MANUFACTURING
FIBER REINFORCED PLASTIC PIPE
Filed Oct. 2, 1961  11 Sheets-Sheet 7

INVENTORS
THOMAS P. LEWIS
DOV HENIS
BY
ATTORNEYS.

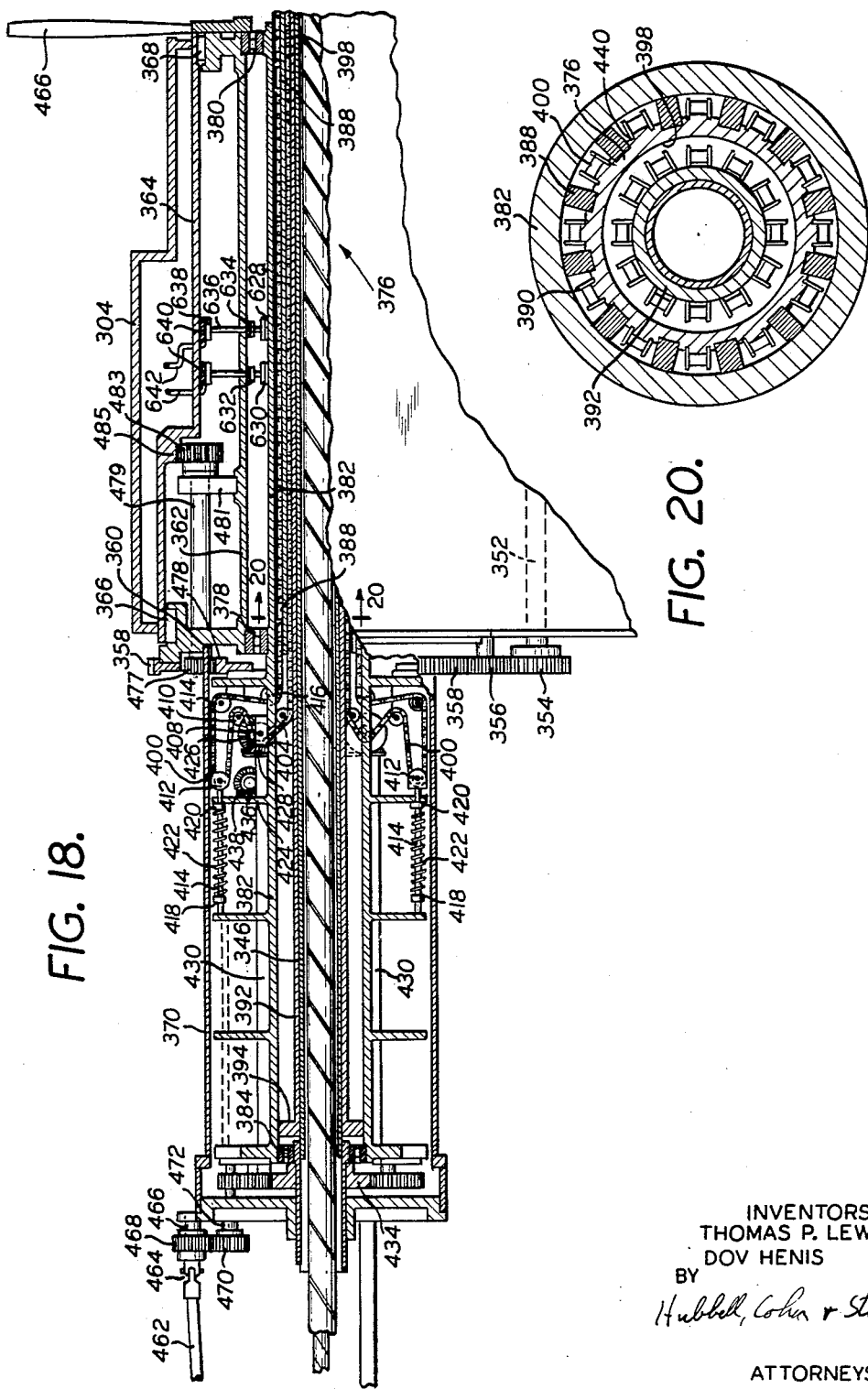

April 21, 1964
T. P. LEWIS ETAL
3,130,104
APPARATUS FOR CONTINUOUSLY MANUFACTURING
FIBER REINFORCED PLASTIC PIPE
Filed Oct. 2, 1961
11 Sheets-Sheet 10
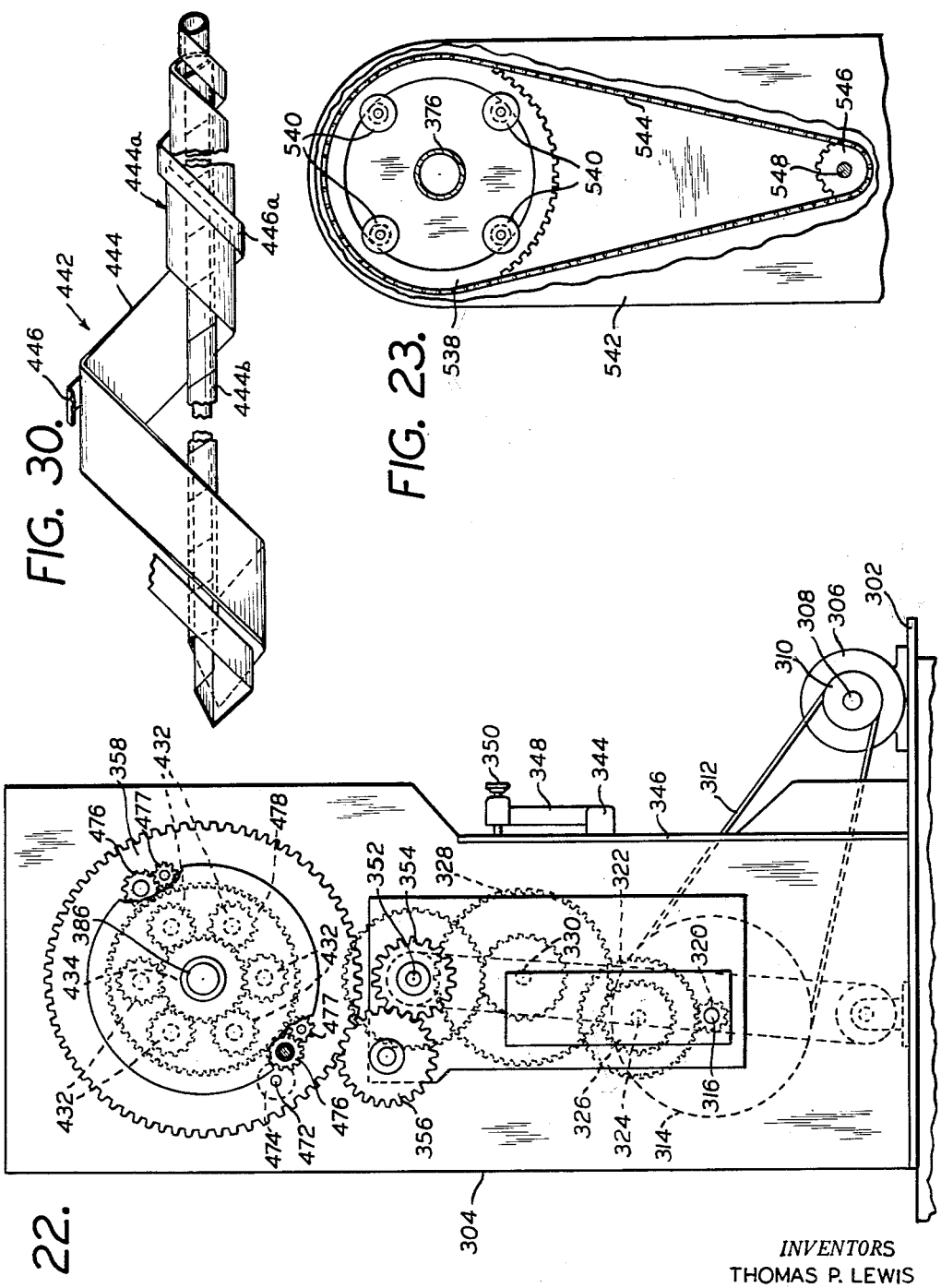
INVENTORS
THOMAS P. LEWIS
DOV HENIS
BY Hubbell, Cohen + Stiefel
ATTORNEYS.

April 21, 1964    T. P. LEWIS ETAL    3,130,104
APPARATUS FOR CONTINUOUSLY MANUFACTURING
FIBER REINFORCED PLASTIC PIPE
Filed Oct. 2, 1961    11 Sheets-Sheet 11
FIG. 27.
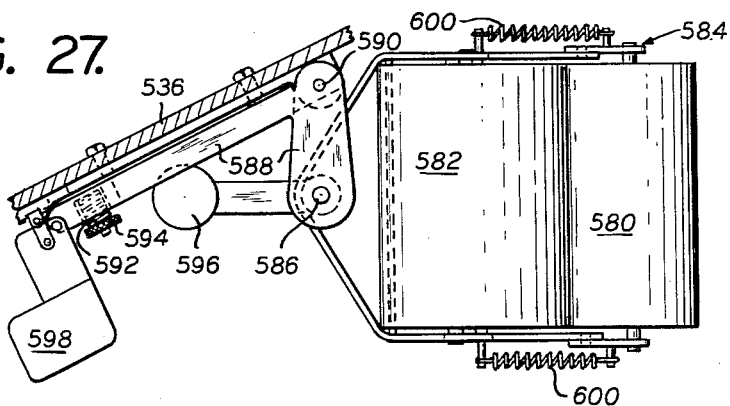
FIG. 28.
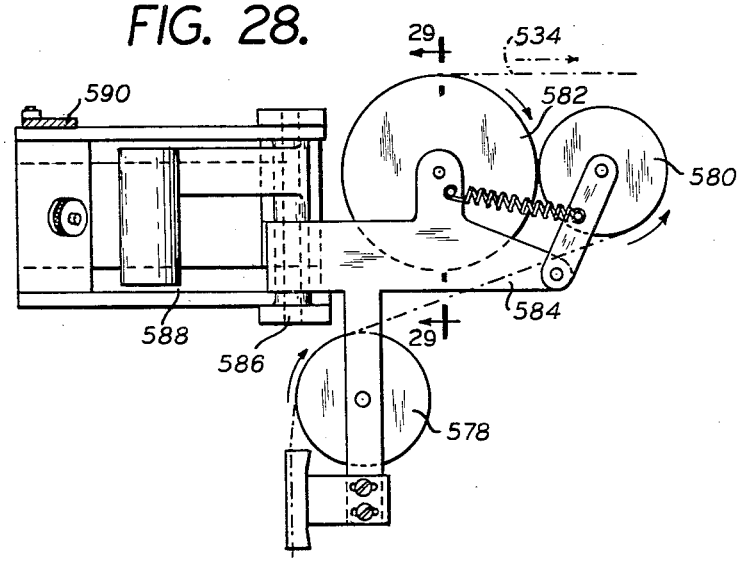
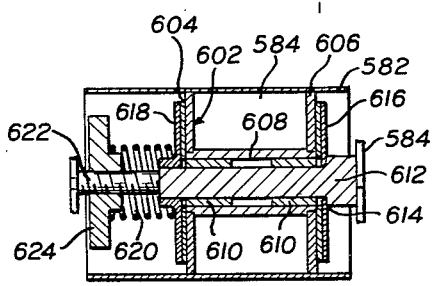
FIG. 29.
INVENTORS
THOMAS P. LEWIS
DOV HENIS
BY Hubbell, Cohen & Stiefel
ATTORNEYS.

United States Patent Office 3,130,104
Patented Apr. 21, 1964

3,130,104
APPARATUS FOR CONTINUOUSLY MANUFACTURING FIBER REINFORCED PLASTIC PIPE
Thomas P. Lewis, North Apollo, and Dov Henis, Pittsburgh, Pa., assignors, by mesne assignments, to Apollo Carlon Pipe Company, Ponca City, Okla., a corporation of Pennsylvania
Filed Oct. 2, 1961, Ser. No. 142,047
10 Claims. (Cl. 156—425)

This invention relates to a method and apparatus for making reinforced plastic hollow members and more particularly for making fiberglass reinforced plastic hollow members such as pipes, conduits and so forth, which may either be circular in cross section or in some polygonal form. Most particularly, the invention relates to a method for making fiberglass reinforced plastic pipe.

This application is a continuation-in-part of our earlier filed application Serial No. 614,729, filed by us on October 8, 1956, now U.S. Patent No. 3,004,585, for Method and Apparatus for Continuously Manufacturing Reinforced Plastic Pipe, and assigned to the assignee hereof.

Fiberglass reinforced plastic pipe has been known heretofore and its highly desirable properties have been fully appreciated. Among the advantages of using fiberglass reinforced plastic pipe, hereinafter referred to as plastic pipe, are the ease of handling due to the light weight, the corrosion resistance and the ease of connecting sections of said pipe together. Unfortunately, the advantages of plastic pipe have not been fully realized because of the present excessive cost of manufacturing such pipe. The major reason for the prohibitive cost of such pipe is due to the fact that no simple fully automatic method has been devised for its manufacture.

Initially, plastic pipe was made by winding plastic impregnated reinforcing tape on a slightly tapered cylindrical form, curing the plastic and thereafter removing the cured pipe from the cylindrical form. This was a completely manual operation and the costs of labor were so high as to render the ultimate price of the finished product prohibitive. Moreover, the pipe took on the slight taper of the form. Subsequently, machines were developed which automatically wind plastic impregnated fiberglass tape onto a mandrel. Although such machines reduce the cost of manufacturing plastic pipe, it is still necessary to manually remove the plastic pipe from the mandrel and often this removal is effected by disengaging the mandrel from the winding machine and thereafter removing the pipe therefrom. A new mandrel is then substituted for the one on which the pipe has been formed. In addition to the excessive costs of the method hereinbefore described, it will be obvious that by using such methods plastic pipe could only be made in discrete lengths, the length being determined by the length of the mandrel.

Another method of manufacturing plastic pipe is by a slush casting method which has been ordinarily used to make large diameter pipes. Unfortunately, the slush casting method is completely unsuitable for making anything but very short lengths of pipe and this method of manufacturing the short lengths of pipe is extremely expensive.

The present invention is directed primarily to the provision of a new machine which will manufacture reinforced plastic pipe or tubing at extremely low cost and this is the major object of the present invention.

Another object of the present invention is the provision of a new machine for manufacturing plastic pipe which is adapted to make a continuous pipe of any desired length, be it feet or miles.

A further object of the present invention is the provision of apparatus for making plastic pipe which will have an extremely smooth interior surface to thereby reduce friction between it and the fluids flowing therein.

Still another object of the present invention is the provision of a fully automatic machine to manufacture plastic pipe.

Yet a further object of this invention is the provision of a novel mandrel which has a continuously progressively movable surface to advance plastic pipe lengthwise therewith and thus form a means of manufacturing plastic pipe of indefinite length.

The above and other objects, characteristics and features of the present invention will be more fully understood from the following description taken in connection with the accompanying illustrative drawings.

In the drawings:
FIG. 1 is a side elevational view of an automatic machine for making fiberglass reinforced plastic pipe in accordance with the present invention;
FIG. 2 is a longitudinal sectional view of a portion of the machine shown in FIG. 1;
FIG. 3 is a sectional view taken along the line 3—3 of FIG. 2;
FIG. 4 is an end elevational view of the machine shown in FIG. 1 with parts broken away to more clearly illustrate other parts of said machine;
FIG. 5 is an enlarged fragmentary perspective view of portions of the mandrel included in the machine forming the present invention;
FIG. 6 is a diagrammatic view of the path of movement of a flexible wrapper forming a part of the present invention;
FIG. 7 is a perspective view with parts broken away illustrating the product formed by the present invention;
FIG. 8 is a view similar to FIG. 5 illustrating another form of the present invention;
FIG. 9 is a sectional view taken along the line 9—9 of FIG. 2;
FIG. 10 is a fragmentary perspective view illustrating details of a portion of the drive means included in the present invention;
FIG. 11 is a view similar to FIG. 10 showing another modification of the present invention;
FIGS. 12 and 13 taken together with FIG. 12 on the left and FIG. 13 on the right are a side elevational view of the now presently preferred embodiment of automatic machine for making fiberglass reinforced plastic pipe in accordance with the present invention;
FIG. 14 is a sectional view taken along the line 14—14 of FIG. 12;
FIG. 15 is a sectional view taken along the line 15—15 of FIG. 12;
FIG. 16 is a sectional view taken along the line 16—16 of FIG. 13;
FIG. 17 is a sectional view taken along the line 17—17 of FIG. 13;
FIG. 18 is a sectional view taken along the line 18—18 of FIG. 12;
FIG. 19 is an end elevational view of a modified form of heating means for the fiber reinforced plastic tape;
FIG. 20 is a sectional view taken along the line 20—20 of FIG. 18;
FIG. 21 is a sectional view taken along the line 21—21 of FIG. 13;
FIG. 22 is a sectional view taken along the line 22—22 in FIG. 12;
FIG. 23 is a sectional view taken along the line 23—23 in FIG. 12;
FIG. 24 is an enlarged perspective view with certain parts cut away of the extreme right hand end of the mandrel;
FIG. 25 is an end view of the left hand end of the mandrel taken along the line 25—25 of FIG. 12;
FIG. 26 is a side elevational view of the left hand end of the machine shown in end view in FIG. 25;

FIG. 27 is a top view of the tensioning device for feeding the inner wrapper of the machine to the mandrel thereof;

FIG. 28 is a side view of the tensioning device for feeding the inner wrapper of the machine to the mandrel thereof;

FIG. 29 is a sectional view taken along the line 29—29 in FIG. 28; and

FIG. 30 is a view similar to FIG. 6 illustrating the paths of movement of the two segments of the inner wrapper means employed in the presently preferred form of our invention.

Figure 13:
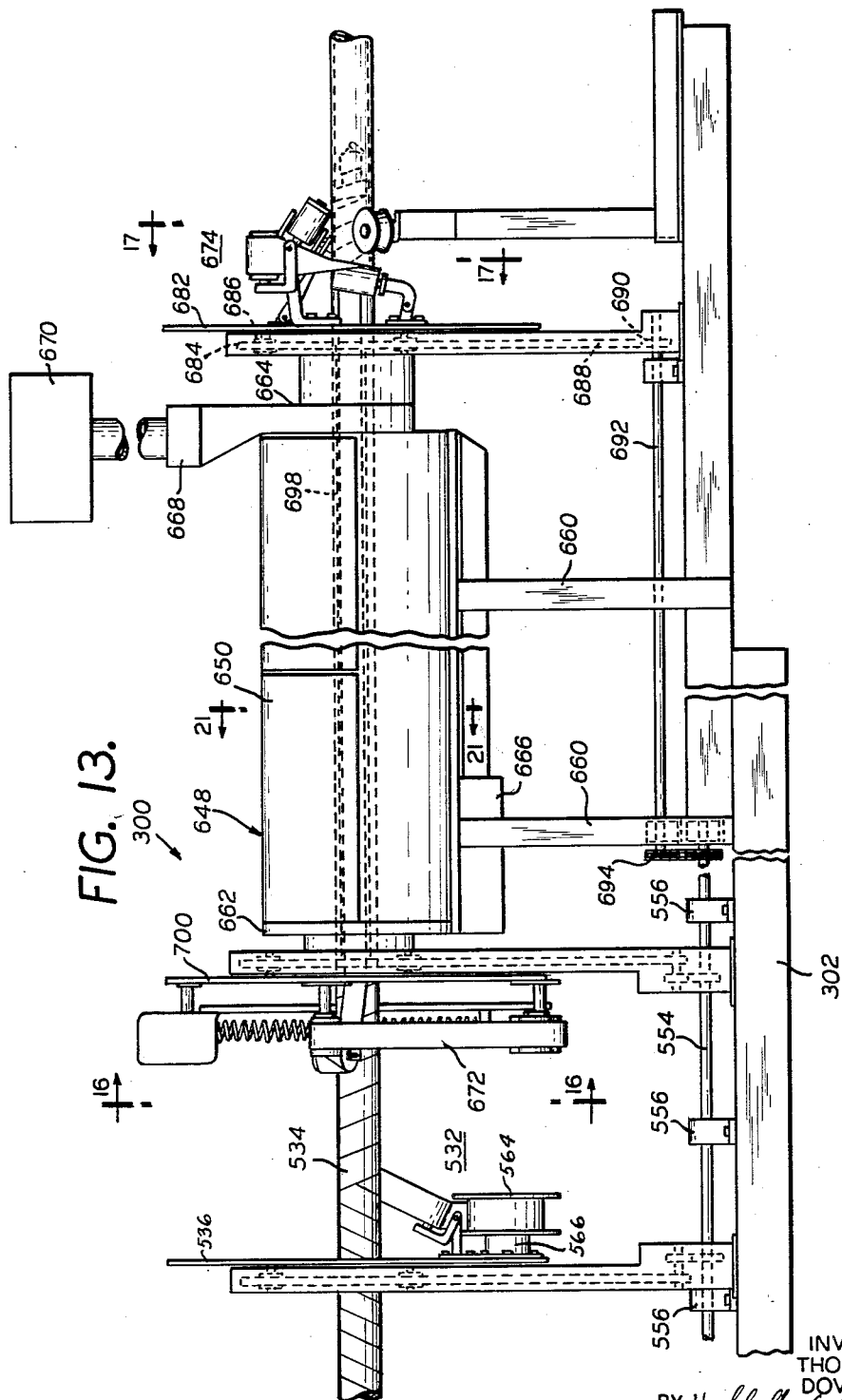
Figure 14:
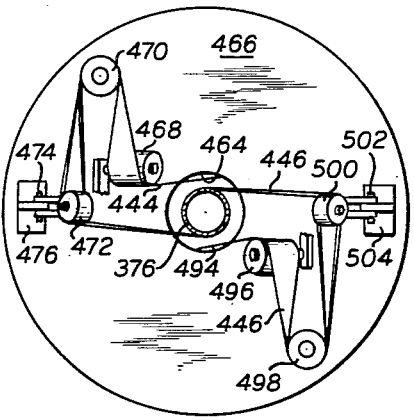

Referring now to the drawings in detail, and particularly to FIGS. 1 through 11, the machine for making fiberglass reinforced plastic pipe is generally designated by the reference numeral 10. This machine comprises a stationary base 12 having a cylindrical portion 14 extending transversely of the base and acting as a support for the various elements of the machine. Supported directly and indirectly by the base portion 14 is a rotating mandrel 16, a pair of movable spool holders 18 and 20, and a fixed spool holder 22. A fixed spool holder 24 is supported by the base 12 through a bracket 25. The spool holders are adapted to hold spools of reinforcing tape and to supply said tape to be wrapped around said mandrel whereby to form a reinforcing network for a plastic pipe. The reinforcing tape may be any flexible type of material and fiberglass is presently preferred. Most preferably, the tape is a fiberglass roving, although a woven fiberglass may be used as well as rovings and woven tapes of other reinforcing materials. The reasons why we presently prefer a roving will become more apparent as this description proceeds.

The movable spool holder 20 is fixed to a cylindrical sleeve 26 which is rotatably mounted on the cylindrical base part 14 as by bearings 28 carried by a bearing support 29 fixed to base 12. A gear 30 is fixed to sleeve 26 and is in meshed relationship with a drive gear 32 which imparts rotary movement to gear 30 and hence to sleeve 26, whereby to impart rotary movement to spool holder 20. Another sleeve 34 is movably mounted concentrically of the base 14 and is disposed within the cylindrical portion 14 of the base 12. As shown herein, sleeve 34 has two spaced concentric cylindrical portions 35 and 36, portion 35 being in operative engagement with bearings 37 which also engage stationary part 14 of base 12. The space between cylindrical portions 35 and 36 is designated 38 which provides a passage for the fiberglass roving carried by the spool holder 18 mounted on cylindrical part 36. The sleeve 34 carries a gear 42 mounted at the left hand end of part 35, which is in meshed relationship with a drive gear 44 to impart rotary movement to the spool holder 18 and to sleeve 34. As will become clear hereinafter, spool holders 18 and 20 preferably rotate at the same angular velocity.

Disposed concentrically within the sleeve 34 and spaced therefrom is another fixed cylindrical member 46 which is separated from the sleeve part 36 by bearings 48. Fixed cylindrical member 46 is actually made up of two fixed cylindrical members 50 and 52 which are concentric and which are spaced from one another by guide ridges 53 to provide a channel or path for a flexible wrapper and a separator therefor as will be described in more detail hereinafter. Mounted on the inner cylindrical part 52 of cylindrical members 46 are ball bearings 54, the outer races of said ball bearings being connected to the stationary cylindrical member 52 and the inner races thereof being connected to a fixture 56 which surrounds and is connected to a longitudinally extending rotatable pipe or cylindrical member 60 forming part of the mandrel 16. Fixture 56 is in fact a cylindrical shaft having internal ridges or splines 61 extending longitudinally thereof, the free surfaces of said splines being fixed to the external surface of tube 60 in any suitable manner so that the two parts rotate in unison (see FIG. 9). The splines 61 define therebetween passages 63 for a purpose which will become clear as this description progresses.

The longitudinally extending pipe 60 is the basic forming element for the plastic pipe to be made by the machine 10. The length of the pipe 60 is not critical but as will become apparent hereinafter, pipe or tubular member 60 must be sufficiently long to give the plastic pipe which is formed thereon an opportunity to be at least partially cured prior to removal therefrom in a manner to be described hereinafter in order to be able to maintain its form. Tubular member 60 is rotated through the medium of a fixture 62 which is fixedly connected to the tube 60 by means of tines or fingers 64 which are pressed to fit internally into the tube 60. The fixture 62 is provided with a plurality of outwardly extending fingers or finger portions 65 which are fixedly connected to an adapter 66 in the form of a continuous ring. Carried by the adapter ring 66 is a ring gear 67.

Referring now to FIG. 4, the ring gear 67 is in meshed relationship with a spur gear 68 which extends through registered slots 69 in cylindrical portions 50 and 52 of sleeve 46. Gear 68 is driven by a spur gear 70 mounted on a shaft 71 which has provided thereon another spur gear 72 which rotates in unison with gear 70. Gear 72 is driven by a gear 73 mounted on a shaft 74 which carries a gear 75 which rotates in unison with the gear 73. Gear 75 is in meshed relationship with a ring gear 76 which is fixed to sleeve 34 and rotatable therewith. As shown in FIG. 2, ring gear 76 is located adjacent the extreme left hand end of sleeve 36. By employing the train of gears as described above, when gears 32 and 44 rotate in a manner to be described presently, rotation is imparted to sleeves 34 and 26 and from sleeve 34 through the last mentioned gear train including elements 67 to 75, adapter 66 is rotated and thereby imparts rotary movement to fixture 62 and tube 60 forming the main portion of mandrel 16. To impart rotary movement to gears 32 and 44, a main drive shaft 77 carrying a pulley 78 is mounted on base 12. Pulley 78 is driven by a belt 79 from a suitable motor means (not shown) to rotate the main shaft 77. Carried by the main shaft 77 is a spur gear 80 which is in meshed relationship with another spur gear 81 mounted on a shaft 82 which is also carried by the base 12. Fixed to the shaft 82 is another spur gear 83 which is in meshed relationship with a spur gear 84 carried by a drive shaft 85. Gears 32 and 44 are fixed to the shaft 85 and, accordingly, they rotate in unison with the gear 84. In this manner power is provided from the motor means to the plurality of rotatable elements in machine 10.

In accordance with one highly desirable feature of the present invention, means are provided on the surface of the forming member or tubular member 60 which move longitudinally of said tubular member. Accordingly, and as will become more apparent hereinafter, when the plastic impregnated fiberglass roving is wound onto the mandrel 16, it moves longitudinally thereof and by suitable heating means is cured while moving longitudinally of said mandrel and after being cured is moved off said mandrel, whereby to provide for a continuously formed pipe unachieved heretofore. As shown herein and as is presently preferred, the movable means on the mandrel 16 comprises a plurality of continuous conveyor elements here shown as continuous ribbons 86 which extend longitudinally of the pipe 60 along the outer surface thereof and also extend through said tubular member 60 between it and the outer surface of a fixed tubular member 87. Other flexible members such as chains or belts may be used. The plurality of ribbons 86, here shown as eight in number, engage at each end roller means, shown in FIGS. 1, 2, 3, 5 and 10 as rollers 88 and 89 although chain sprockets or other roller means may be employed. Rollers 88 and 89 are operatively rotatably mounted on the tubular member 60. As shown herein, particularly in FIG. 10, the rollers 88 are rotatably mounted on axles 90 which extend between adjacent spaced arms 64 of the fixture 62. The rollers 89 are rotatably mounted on axles 91 which are mounted in a suitable fixture 92 fixed to the right hand end of the tubular member 60. In a manner to be described below, the rollers 88 are positively driven to thereby rotate and move the ribbons 86 longitudinally of the tubular member 60, the rollers 89 acting as guide and idler rollers. The ribbons 86 pass between rollers 88 and 89 through passages 63 defined by splines in fixture 56. The direction of rotation of the rollers 88 is such that the portions of the ribbons 86 overlying the outer surface of the tubular member 60 move in a rightwise direction as viewed in FIG. 2.

In order to rotate the driver rollers 88, driver rollers 93 are in frictional engagement with the portions of the ribbons 86 in engagement with the driver rollers 88. The rollers 93 have integrally formed thereon a worm gear 94, the entire assembly rotating on axles 95 extending between the arms 64 of the fixture 62. The worm gears 94 are in meshed relationship with worm wheels 96 which are fixed to shafts 98 rotatably mounted in the fixture 62. Fixed to the left hand ends of the shafts 98 are planetary gears 102 which are all in meshed relationship with a sun gear 104 fixed to a fixed tubular member 87. Accordingly, when the motor means is actuated to operate the gear trains aforedescribed to thereby impart rotary movement to the tubular member 60 and fixture 62 about their longitudinal axes, planetary gears 102 will rotate therewith about the axis of fixture 62 and due to their engagement with the fixed sun gear 104 will rotate about their own axes to impart rotary movement to the shafts 98 about their respective longitudinal axes, and thereby impart rotary movement to worm gears 96 to rotate drive rollers 93 and thereby impart rotary movement to rollers 88 and linear movement to the ribbons 86. To maintain hollow shaft 87 fixed, a bracket 105 is fixed at one end to fixed shaft 87 and fixed at its other end to fixed sleeve portion 52 of sleeve 46. By means of the gear drives aforedescribed, spools 18 and 20 are preferably caused to rotate at twice the angular velocity of the tube 60 and in the same direction. The purpose for this will become clear hereinafter. Suffice it to say at this point that many other types of drive mechanisms may be employed and the present invention is not limited to the one illustrated in FIG. 3. Moreover, as will become apparent as this description progresses, the ratio of speeds of the spool holders to the mandrel is not necessarily 2:1 and other suitable ratios may be employed.

As stated hereinbefore, in the mechanism 10 illustrated in the drawings there are four spool holders 18, 20, 22 and 24, spool holders 18 and 20 being rotatable about the longitudinal axis of the mandrel 16 at twice the rotational speed thereof and spool holders 22 and 24 being stationary. Each of the spool holders 18, 20, 22 and 24 is adapted to carry a spool of fiberglass roving 122, 124, 126 and 128, respectively, said spools being rotatably mounted in said spool holders. The fiberglass roving 122 is brought onto the mandrel 16 in a spiral path extending from the spool holder 18 to the mandrel 16 around the inner cylindrical part 36 of the rotatable cylindrical member 34, it being disposed in the space 38 between the cylindrical parts 35 and 36 of the sleeve 34, the path being defined by a helical guide ridge 130. The fiberglass roving 126 which comes off the stationary spool holder 22 is brought onto the mandrel 16 in a spiral path in which the roving 126 overlies the outer surface of the stationary cylindrical part 14 of the base 12 in helical form defined by helical guide ridge 129. Resin from a reservoir 132 is supplied to roving 126 through a passage 134. Roving 124 passes off the spool 20 and winds around sleeve 26 in a helical path defined by helical guide ridge 136. From the sleeve 26 the roving moves onto the mandrel 16 on which it is wound in the form of a helix. The roving 128 which is supplied from spool holder 24 which is fixedly supported by base 12 is wound directly from the spool holder 24 to the mandrel 16. In passing from the spool holder to the mandrel, the roving 128 comes into close relationship with a suitable resin supply 137 which is supplied by resin reservoir 135 to impregnate roving 128.

As is clearly shown in FIG. 2, roving 122 which is not impregnated with resin, is the first or bottom layer of the pipe laid down onto the mandrel 16. Since, with the motor means energized, the surface of the mandrel for all intents and purposes is moving longitudinally thereof due to the movement of the ribbons 86 and is rotating at a given angular velocity and roving 122 is rotated with sleeve 34 at twice said angular velocity and in the same direction, the roving 122 is formed onto the mandrel in a spiral wound in a given direction. The parts are proportioned to move at such speeds that the edge of the roving is disposed at an angle to the vertical which is substantially equal to 26°34′. Assuming the roving is three inches wide, it will be desired that 3.82 convolutions of the spiral will be laid onto the mandrel per foot with about ⅛ inch overlap on each adjacent convolution. These figures are presented as being the most desirable for reasons of strength as will be described more clearly subsequently, and it will be obvious that other speeds and angular dispositions may be selected if desired.

The second layer of the pipe is formed of a spiral extending in the opposite direction or being angularly related to the spiral defined by the roving 122 and being disposed also at an angle of 26°34′ to the vertical. The second layer, formed of the roving 126 is, as stated hereinbefore, impregnated with plastic or resin, the impregnation being to a sufficient degree so that when the roving 126 is wound onto the mandrel and overlies the roving 122, resin from the roving 126 flows into the roving 122 to impregnate the latter. Roving 126 is fed to the mandrel from a stationary means whereby the spiral it forms on mandrel 16 is wound in the opposite direction to the spiral formed by roving 122. The forming of the plastic pipe 140 with the additional two layers 124 and 128 is substantially the same as that for layers 122 and 126 whereby to make a four-ply pipe 140 with all of the convolutions disposed at angles to the vertical substantially equal to 26°34′, and the resin from the rovings 126 and 128 causing resin impregnation of the rovings 122 and 124. As stated above, two of the layers are wound in one direction and the other two layers are wound in the opposite direction. It will be seen that as the rovings are laid onto the mandrel, due to the longitudinal movement of the ribbons 86, the spirally wound rovings will move to the right as viewed in FIG. 1. As they move to the right they will be subjected to heat from a suitable heating means 139 in close proximity to the mandrel, whereby to cure the resin and after curing the plastic pipe 40 continues to move longitudinally of the mandrel and off the mandrel, whereby to make room for additional lengths of the same pipe 140. It will be seen therefore that the pipe 140, since it is constantly moving to the right due to the movement of the ribbons 86, can be made as long as is desired, there being no limits since when the spools for the several rovings are exhausted, new rovings can be secured thereto, and as the resin reservoir is depleted additional resin may be supplied thereto also.

As stated hereinbefore, we presently prefer to use a roving rather than a woven tape. We choose a roving since with all the fibers extending in the same direction we achieve far greater strength in a peripheral direction than can be achieved with a like amount of material in a woven tape.

Moreover, we presently prefer to wind the roving at angles of 26°34′ to the vertical because at this angle the reinforcing roving tends to give twice the reinforcement in the peripheral direction than is given in the longitudinal direction and since plastic pipes of the type shown in FIG. 7 and designated 140 are normally subjected to much greater peripheral stresses than to longitudinal stresses, a light weight pipe of suitable strength can be achieved when the rovings are disposed at said angles. Of course, if peripheral strength is not a critical factor, other angles may be used.

The resin utilized to manufacture the plastic pipe may be any suitable thermosetting or thermoplastic resin. We presently intend to use epoxy resins and polyester resins and polyester resins are presently preferred. It will be obvious that the heating means 139 surrounding the mandrel for curing the resin must be able to subject the pipe 140 to sufficiently high temperatures to cure the type of resin being employed and should be long enough, taking into account the linear speed of ribbons 86, to fully cure the resin.

An alternative means for heating pipe 140 to effect the curing of the resin is to provide in addition to heating means 139, an internal heating means 141 disposed between rotating member 60 and fixed member 87. Heating means 141 is preferably designed to heat the inner portion of pipe or tube 140 to a slightly higher temperature, of the order of 50° F., than the heating means 139 heats pipe 140. This will cause a flow of the resin toward the innermost layer of fiberglass roving to render said layer resin-rich. The concentration of resin in the innermost layer will render said layer highly resistant to corrosion whereby to greatly increase the life of the pipe 140.

The embodiment of the invention described hereinbefore will operate in the described manner. However, there are a number of disadvantages to this construction which can be obviated by the addition of a flexible wrapper 142 in a manner to be described presently. The disadvantages of the structure described above result from the fact that if the bottom layer or roving 122 is wound directly onto the plurality of longitudinally movable ribbons 86, there will be of necessity an irregular inner surface in the pipe 140, which irregular surface will tend to increase the amount of friction to fluid flow therein. Moreover, there is a distinct possibility of clogging due to resin getting between the outer surface of the longitudinally extending tubular member 60 and the ribbons 86, whereby to prevent efficient operation of the mechanism or possibly to discontinue operation entirely.

In order to obviate these difficulties, and as stated hereinbefore, a flexible wrapper 142 is used. The flexible wrapper may be of any suitable material which will not adhere to the resin, but preferably the flexible wrapper is made of steel. The flexible wrapper is wound onto the mandrel 16 to overlie the ribbons 86 in an overlapping spiral, whereby to prevent any resin from coming in contact with the ribbons or the longitudinally extending tubular member 60. If desired, the wrapper may merely be carried on a spool and taken off the spool due to the rotation of the mandrel and gathered up at the opposite end of the mandrel by another spool which rotates at a suitable angularly velocity. It will be obvious from a perusal of FIG. 6 that the wrapper 142 underlies the bottom layer of fiberglass roving 122 and thereby separates it from the ribbons and tubular member 60. Since the wrapper 142 may be extremely thin, the overlap from convolution to convolution will cause little surface irregularity on the inner surface of the pipe 140 and thereby give it excellent flow characteristics as well as to prevent clogging of the mechanism with the resin. Although the metal wrapper does not readily adhere to the resin, in order to insure no fouling of the metal wrapper, a suitable separator is supplied to the wrapper prior to coming into engagement with the bottom layer 122 of roving. This separator is supplied from a separator supply reservoir 144 through a channel 146 extending between the two fixed tubular portions 50 and 52 of the sleeve 46. At the right hand end of the channel 146 is an applicator 148 which has a passage 150 extending from the channel 146 to a suitable pad 152 which may be made of felt, foam rubber or other like material. The pad 152 engages the wrapper 142 as it is first wound onto the mandrel 16 at the left hand end thereof and coats it with a suitable separator such as a silicone grease in order to prevent adhesion of the wrapper to the resin. Although silicone grease is preferred, other hydrocarbon greases may be employed.

As is now presently preferred, in lieu of a hydrocarbon grease separator, wrapper 142 is thinly permanently coated with polytetrafluoroethylene, polytrifluorochloroethylene, or other similar material. Materials of this type are inert and thereby act as an ideal separator. Moreover, once the wrapper is coated with such material, the need for a separator supply is obviated, thereby eliminating the expense of providing such supply and the need for periodically refilling the separator reservoir. If desired, wrapper 142 may be made wholly of polytetrafluoroethylene, polytrifluorochloroethylene or the like.

Athough the manner of supplying and withdrawing the wrapper 142 from the mandrel 16 as described above will operate satisfactorily, it has the shortcoming of requiring a shutdown of the machine each time a spool of wrapper is exhausted whereby to prevent continuous automatic manufacture of pipe. To obviate this shortcoming and as one of the highly desirable features of the present invention, we have devised a continuous wrapper. The path of movement of the continuous wrapper will now be described: Starting from the applicator 148 the wrapper is wound spirally about the mandrel in overlying relationship with the ribbons 86 and naturally moves with said ribbons longitudinally of the mandrel. At the extreme right hand end of the mandrel where the wrapper will tend to move off the mandrel 16 and separate from the pipe 140 being formed thereon, the wrapper is directed through open right hand end of the tube 87 into the interior of said tube 87. In so directing the wrapper it is wound into a spiral in which the convolutions extend in the opposite direction to that portion of the wrapper overlying the mandrel. In FIG. 6 the spirally wound portion of the wrapper 142 overlying the mandrel is referred to as 142a and the reversely wound wrapper portion disposed within the shaft 87 is designated 142b. The portion 142b extends the entire length of the hollow shaft 87 interiorly thereof and moves to the left relative thereto in a manner which will become clear presently. At the left hand end of the portion 142b of wrapper 142, the wrapper passes out of the shaft 87 through the left hand end opening thereof. From the left hand opening the wrapper passes through a cut-out portion 143 in part 52 of sleeve 46 to helical guide ridge 53 defined on the inner part 52 of the fixed cylindrical member 46. This helical guide ridge guides the wrapper around said portion 52 to the right hand end thereof where the wrapper 142 extends upwardly to the separator. All the various movements of the continuous wrapper are imparted thereto due to the longitudinal movement of the portion 142a in the rightwise direction as imparted by the ribbons 86. Since the portion 142a is constantly moving to the right, it will require placement from the portion of the ribbon designated 142c which is disposed in the helical groove 53 and since the portion 142c will accordingly move longitudinally of said groove, it will constantly draw the spirally wound portion 142b to the left, thereby constantly supplying a new portion of the wrapper to make it the part 142c. In this manner the wrapper need never be replaced or made up with additional spools and so forth, the wrapper 142 becoming an integral part of the apparatus.

Referring now to FIG. 8, a modification of the present invention is illustrated. In this modification the roller means disposed at both ends of the mandrel 16 are rotatable sprockets 180 which are in operative engagement with a plurality of suitable chains 182 having portions extending over the surface of tubular member 60 and other portions extending through the interior of tubular member 60. The chains operate as continuous flexible members in much the same way as do the ribbons 86 described above. The manner for imparting movement to the driver sprockets 180 may be similar to that employed for the driver rollers 88 described above with necessary modifications well within the ability of those skilled in the art. It is believed that the operation of this modification is clear from the description of the operation of the embodiment including the ribbons 86. It should be noted that when employing a mandrel 16 having chains extending along the surface thereof, it is practically mandatory to employ a wrapper such as wrapper 142 since the surface irregularities of any finished product made on a machine not including said wrapper would make the product commercially undesirable. It may be desirable to dispose the upper portions of the chains 182 within longitudinal recesses in the mandrel whereby to render the upper surfaces of the chains 182 just a slight bit out of flush with the surface of the tubular member 60. One of the major advantages to employing chains as the continuous flexible member in lieu of ribbons is that an increased amount of power may be supplied thereto to effect smooth undisturbed movement of heavy pipe 140.

Referring now to FIG. 11, another modification of the present invention is illustrated. In this modification, the drive ribbons 86' are substantially identical to the driving ribbons 86 heretofore described with the exception that they are provided with a plurality of apertures 200 which are spaced longitudinally along the ribbons 86'. The apertures 200 are engaged by cogs 202 on the surface of the roller 88'. Roller 88' is provided at its ends with spur gears 204 which are in meshed relationship with spur gears 206 respectively fixed at opposite ends of worm wheel 94'. Worm wheel 94' is in meshed relationship with worm 96' which may be rotated in the same manner in which worm wheel 96 in FIG. 10 is rotated, as was described hereinbefore. With the arrangement shown in FIG. 11, ribbons 86' are positively driven by means of the cogs 202 and the apertures 200 whereby to insure against slippage when the machine is operating under load.

It will be obvious in view of the foregoing paragraph that link belts, timing belts, and other suitable types of continuous flexible members may be employed as conveyor elements to effect longitudinal surface movement along the mandrel 16 without departing from the spirit and scope of the present invention.

Various other features and modifications of the basic mechanism described hereinbefore may be employed. For instance, a superior uniformity of resin impregnation is achieved if prior to the rovings 126 and 128 being immersed in the resin they are heated as by passing between a pair of parallel heated plates 160.

Another highly desirable modification of the present invention is the substitution for the bottom layer of roving 122 by a ribbon of thermoplastic material which will provide the plastic pipe 140 with a corrosion and waterproof lining to prevent "weep" as might occur if polyester were used to impregnate the rovings. Examples of suitable thermoplastics are polyvinyl chloride and polyethylene. The operation of the machine will be precisely the same save for the substitution of the thermoplastic ribbon for the roving 122.

In accordance with another modification of the present invention, the inner and outer surfaces of the pipe formed by machine 10 may be overlayed by random oriented fiber, either natural or synthetic. We presently prefer synthetic fibers and most preferably prefer random oriented acrylic fibers. These fibers may be introduced into the pipe in the form of a tape made up of random oriented fiber and preferably either prior to or at the time of introduction onto the mandrel the fibers are impregnated with resin, preferably the same resin as is used to impregnate the fiber glass rovings although different resins may be employed. By incorporating inner and outer layers of random oriented impregnated fibers, we have found that the corrosion resistance and erosion resistance of the final product are greatly increased over that possessed by a pipe having only layers of impregnated rovings.

It is also within the scope of the present invention to make the entire mandrel and associated parts removable and replaceable as a unit, whereby to adapt a single machine 10 to make plastic pipes of different diameters.

A machine 10 embodying some or all of the features described herein has vast utility. Not only may it be permanently located in a factory as would be expected, but it can readily be mounted on a vehicle to manufacture pipe and lay pipe directly from the end of the mandrel, the vehicle moving at a rate to let the pipe fall smoothly into place. This will not only result in a vast speedup in pipe laying procedure, but will obviate the necessity of shipping bulky pipe to the site where it is to be laid, only the relative compact raw materials needing to be shipped.

Although the machine 10 together with all the modifications thereof have been described as being used in conjunction with a cylindrical mandrel, it will be understood that the present invention may be readily employed to manufacture rectangular and polygonal pipe. All that need be done to adapt the machine for such use is to shape the longitudinally extending tubular member 60 into the form desired for the final product. That is, if a square pipe is desired, member 60 should be square and if a hexagonal pipe is desired, member 60 should be hexagonal in cross section. With this one change the mandrel construction described hereinbefore may be employed to make the final product.

The presently preferred form of the invention is shown in FIGS. 12 through 30 inclusive in which the presently preferred form of the machine is generally designated by the reference numeral 300. The machine is shown in elevation in FIGS. 12 and 13 taken together with FIG. 12 on the left.

Referring now to FIGS. 12 and 22 in detail, the machine 300 is provided with a base or platform 302 on which is mounted a housing 304 which is fixedly secured to the base 302 as by nuts and bolts, rivets, welding or the like. Supported by the base 302 is a motor means here shown as an electric motor 306 although any other suitable source of motor power may be employed. The motor output shaft 308 has mounted thereon a pulley 310 about which a V-belt 312 extends. The V-belt 312 runs around a second pulley 314 which is mounted on a shaft 316 that is journaled in bearings 318 on the sides of the housing 304. Fixed to the shaft 316 is a spur gear 320 which is in meshed relation with a gear 322 mounted on a shaft 324 which also carries a pinion 326. The pinion 326 is in driving relation with a gear 328 which is fixed to a rotatable shaft 330 also journaled in bearings in the housing 304. Keyed to shaft 330 is a gear cluster 332 made up of a gear of relatively small diameter 334 and a gear of relatively large diameter 336 the gear cluster being axially movable relative to the shaft 330. The gear 334 is adapted to mesh with a gear 338 of relatively large diameter and in the alternative the gear 336 is adapted to mesh with a gear 340 of relatively small diameter 340. When the gear cluster 332 is shifted to the right as viewed in FIG. 12 gear 334 moves into meshed relation with gear 338 and gear 336 is out of meshed relation with gear 340. When the gear cluster 332 is shifted axially to the left of shaft 330, then gear 334 is out of meshed relation with gear 338 and gear 336 is in meshed relation with gear 340. To effect the shifting of the gear cluster 332 on the shaft 330, a shift fork 342 is provided, the fork 342 extending through grooves 346 on both sides of a collar 347 forming a part of the gear cluster. The fork 342 is fixed to a shaft 344 which extends through the front wall 346 of housing 304 where it has secured to it a handle 348 (see FIG. 22). When the handle 348 is pivoted, pivotal movement will be imparted through the shaft 344 to the fork 342 to shift the gear cluster 332 as desired. To prevent inadvertent shift of the gear cluster 332 and to insure positive locking of the gear cluster in a desired position, a locking means is provided on the end of handle 348. As shown herein the locking means is very simply a threaded member 350 which is adapted to fit into one of two apertures in wall 346 defining the extreme limits of pivotal movement of the handle 348 and hence of the shaft 344.

Both of the gears 338 and 340 which are selectively actuated by one or the other of the gears in the gear cluster 332 are mounted on a shaft 352. It will be obvious that the shaft 352 will rotate at one of two speeds, depending upon which gear ratio is selected by means of the shifting of the gear cluster 332. In any event, however, shaft 352 will rotate at some preselected speed. Also mounted on shaft 352 outside of the housing 304 is a gear 354 which is in meshed relation with a gear 356 which is rotatably mounted on the housing 304. The gear 356 is in turn in meshed relation with a large diameter ring gear 358 which is secured to the flange 360 of a sleeve 362 which is disposed within the housing 304 (see FIG. 18). Accordingly, it will be seen that the flanged sleeve 360—362 is rotatable with respect to the housing 304 and with respect to an internal sleeve 364 of the housing 304. In order to provide for relatively easy rotation between the parts 360—362 on the one hand and parts 304—364 on the other, roller bearings 366 and 368 are interposed between the parts as shown in FIG. 18. Secured to the flange 360 in any suitable manner as by nuts and bolts, rivets, welding or the like, is a rearwardly extending sleeve 370 which is adapted to rotate with the rotatable flanged sleeve 360—362. Fixed to the left hand end of the sleeve 370 is a disc 372 having a central aperture 374 therewithin.

The sleeves 362 and 370 together with those parts which are connected thereto such as the flange 360 and the disc 372 form a support for a mandrel generally designated by the reference character 376.

As shown in detail in FIG. 18, the mandrel 376 is mounted within and concentrically of the sleeve 362. This mounting is accomplished by two spaced apart ball bearings 378 and 380 on which a mandrel sleeve 382 rotates. The mandrel sleeve extends from the bearing 380 leftward to a zone just to the right of the disc 372. The sleeve 382 at its left hand edge is mounted on a bearing 384 which permits for rotation of the disc 372 and the sleeve 386 secured thereto concentrically with the central aperture 374. The mandrel 376 is fixed to the mandrel sleeve 382 by a plurality of radially extending spaced apart spacers 388. Two sets of the spacers 388 are provided, one in the area of the bearing 378 and one in the area of the bearing 380. The manner of spacing apart the spacers 388 and for securing the spacers to the mandrel sleeve 382 and to the mandrel 376 is shown in detail in FIG. 20. As shown therein the spacers 388 are braised to the mandrel 376 and the mandrel sleeve 382 is pressed fit over the outer surfaces of the spacers 388 to fix the mandrel sleeve 382 relative to the mandrel. It will therefore be seen that the mandrel 376 extends from within the projected area of the bearing 378 rightward as viewed in FIG. 18 to the extreme right hand end of the mandrel as may be seen in FIG. 13.

Disposed within the mandrel concentrically therewith is a pipe 392 which is non-rotatable or fixed relative to the mandrel 376. The pipe 392 is secured to the mandrel sleeve 382 by press fitting or bolting a flange 394 of the fixed shaft 392 to the left hand end of the mandrel sleeve 382. Rotatably disposed within the fixed mandrel tube 392 is a rotatable mandrel tube 396 which is secured at its left hand end to the sleeve 386 which is in turn fixed to the disc 372 which is actually a part of the rotatable sleeve 370. In this manner the rotatable mandrel tube 396 rotates with the sleeve 370 within the fixed mandrel tube 392. The reasons for the inclusion of the fixed and rotatable mandrel tubes 392 and 396, respectively, will become apparent hereinafter as this description proceeds.

From the foregoing description it will be seen that unlike the mandrel 16 shown in FIGS. 1 through 11, the mandrel 376 described in the presently preferred form of this invention is non-rotatable or stationary. The manner of holding the mandrel 376 and its associated so-called stationary sleeves fixed or non-rotatable will be described subsequently in this specification.

As was true in the first illustrated form of the invention, the mandrel is provided with a plurality of longitudinally extending conveyor elements which run from left to right as viewed in FIGS. 12 and 13 on the outer surface of the mandrel and run from right to left as viewed in FIGS. 12 and 13 when they pass through the interior or hollow core of the mandrel. This hollow core is herein designated by the reference numeral 398. As shown herein the conveyor elements are chains 400 although, of course, other longitudinally extending conveyor elements may be employed such as tapes, either solid or perforated, ribbons, wires, or the like. However, roller chains are preferred due to the fact that we have found that friction is lower when employing roller chains and substantial gain in strength may be achieved.

Tracing the path of the conveyor elements 400 of which twelve are employed in the presently preferred form of the invention, each of the elements follows substantially the same path, the elements being displaced from one another circumferentially around the mandrel. The chains 400 pass through the passages 390 between two adjacent spacers 388 which serve to space and connect the mandrel 376 with the mandrel sleeve 382. The chain thereupon passes longitudinally of the mandrel along its outer surface all the way to the right hand end thereof, where it passes around a sprocket or roller 402 (see FIG. 24). The chain thereupon passes within the hollow core 398 of the mandrel 376 between the inner surface of the mandrel 376 and the outer surface of the fixed mandrel tube 392. The chain 400 then travels longitudinally of the mandrel from right to left until it passes beyond the left hand end of the mandrel in the vicinity of the bearing 378 where it encounters a roller or sprocket 404 which is rotatably mounted on the mandrel sleeve 382. The chain 400 thereupon passes upwardly through a slot 406 in the sleeve 382 and thence around a drive sprocket 408 which is also mounted on the mandrel sleeve 382. The manner of driving the drive sprocket will be described hereinafter.

After going around the drive sprocket 408 the chain 400 passes around an idler sprocket or roller 410 and a tension sprocket or roller 412 which is spring biased by a spring 414 to apply a constant tension to the chain 400. After leaving the tension roller or sprocket 412 the chain passes around an idler sprocket or roller 414 and thence downwardly around another idler sprocket or roller 416 whereupon it passes back into the channel 390 between the spacers 388.

The tension roller 412 is biased to the left as viewed in FIG. 18 by the spring 414 which is a compression spring disposed between two collars 418 and 420, the collar 418 being fixed to a stud 422 and the collar 420 being slidably disposed on said stud and being in abutting relation with an upstanding flange 424 on the mandrel sleeve 382. With the spring 414 under compression it will press the collar 414 to the left. Since the collar 414 is fixed to the stud 422, the stud 422 will tend to move to the left and thereby carry roller 412 to the left to thereby impart tension to the chain 400. Of course, should the tension on the chain 400 become unduly large, the tension will be sufficient to move the tension roller 412 to the right overcoming a portion of the spring bias whereby to relieve the tension on the chain 400.

The drive sprocket 408 is driven by a miter gear 426 which is mounted on the same shaft as the sprocket 408. The miter gear is in meshed relation with a companion miter gear 428 which is fixed to a shaft 430 which extends from the miter gear 428 to the left past the left hand end of the mandrel sleeve 382. Fixed to the left hand end of the shaft 430 is a spur gear 432 which is in meshed relation with a sun gear 434 which is in turn fixed to the sleeve 386 that is rotatable with the sleeve 370. Hence, rotation of the sleeves 370 and 386 on which sun gear 436 is fixed will cause a rotation of the gear 432 and hence a rotation of the miter gear 428. When the miter gear 428 rotates the miter gear 426 will rotate and thereby impart rotary movement to the drive sprocket 408 which will drive the chain.

It will be understood that there must be one drive sprocket 408 for each chain 400. Therefore, there must be twelve drive sprockets in the embodiment shown in FIGS. 12 through 30, inclusive. However, in order to save space and parts to make the design simpler and more economical, rather than there being twelve drive shafts 430 and twelve planetary gears 432 this number has been reduced to six. This is accomplished by associating two pairs of miter gears 426 and 428 with each shaft 430 and having the two pairs of miter gears longitudinally offset from one another. The second pair of miter gears associated with the shaft 430 is shown in FIG. 18 to the left of the gears 426—428 and has been given the reference numerals 436 and 438. For clarity of presentation, however, the chain 400 associated with the second pair of miter gears has been omitted.

To prevent any circumferential movement of the chains as they pass longitudinally of the outer surface of the mandrel 376, the outer surface is provided with longitudinally extending grooves 440 which are adapted to receive the edges of the links of the chain 400 to prevent any circumferential movement thereof. Naturally, other means of preventing circumferential shift of the conveyor elements may be provided and if the conveyor elements are of a different design, then other forms of complementary shapes must be provided in order to accomplish this end.

In accordance with the present invention spirally wound wrapper means are provided to overlie the outer surfaces of the outer flights of the conveyor elements or chains 400 in order to provide a relatively smooth resin impervious tube forming surface. The spirally wound wrapper means incorporated in the now preferred embodiment of the invention represents a significant improvement over the wrapper means 142 illustrated in FIG. 6 as incorporated in the first embodiment described herein. While the wrapper means 142 is satisfactory it does from time to time give rise to problems due to the fact that the longitudinal convolutions or turns of the wrapper means 142 on the outer surface of the mandrel overlap one another to thereby tend, if the wrapper is somewhat stiff, to cause a build-up in the diameter of the spirally wound wrapper portion 142a shown in FIG. 6.

To overcome this problem in accordance with the present invention, we employ a wrapper means 442 made up of a relatively wide wrapper 444 and an auxiliary wrapper which is optionally included. The auxiliary wrapper is herein designated by the reference character 446. The purpose of the auxiliary wrapper is to bridge the spaces between adjacent convolutions of the wrapper 444 in order to provide a substantially continuous resin tight pipe forming surface which will prevent resin from seeping into the mandrel to clog the conveyor elements and other portions thereof. As will be described hereinafter, the auxiliary wrapper can be wound on to the mandrel in bridging relation with adjacent convolutions of the wrapper portion 444a and taken off at the other end as a portion of the pipe in which event it will not be a continuous wrapper. However, as is presently preferred and as will be described immediately below, the wrapper 446 is a continuous wrapper having a portion 446a spirally wound about the outside of the mandrel 376 and another portion 446b which is wound in a smaller spiral extending through the hollow mandrel. In accordance with the present invention the wrapper 444 is wound over the outer edges of the chains in such a fashion that the convolutions thereof are slightly spaced from one another rather than being in overlapping relation. By providing such a spacing there is no tendency of the wrapper means to build up in diameter, the diameter always being a constant and fixed by the diameter of the mandrel 376, the dimension of the chains 400 and the thickness of the wrapper 444. As is optional and as is presently preferred, to seal off the mandrel a continuous auxiliary wrapper 446 is also spirally wound about the mandrel in overlapping relation with adjacent convolutions of the wrapper 444. In this manner the spaces are closed off by the auxiliary wrapper and thereby render the tube forming surface formed by the wrapper means 442 to be substantially resin tight to protect the mechanism within the mandrel. In lieu of the auxiliary continuous wrapper 446 a non-continuous auxiliary wrapper in the form of a tape may be employed to bridge the gaps between adjacent convolutions, which tape is adapted to adhere to the inner surface of a pipe formed on the mandrel in a manner to be described hereinafter and to thereafter become a part of the formed pipe.

The means of putting on and taking off the wrapper 442 and the method of operation of the wrapper means will now be described.

The wrapper 442 as heretofore stated, is wound spirally on the outside of the mandrel about the conveyor elements or chains 400, the convolutions of the spirally wound wrapper portion designated in FIG. 30 by the reference numeral 444a being spaced apart from one another by a small amount say of the order of 1/32 of an inch. The wrapper portion 444a is sufficiently tightly wound about the conveyor elements that it will move longitudinally of the mandrel 376 with the conveyor elements whereby to provide a movable tube forming surface for the machine 300. Adjacent the right hand end of the mandrel 376 is a stripper and guide finger 448 which performs two functions. The first of these functions is to strip the wrapper 444a from the interior surface of the pipe formed thereon and the second of the functions is to guide the wrapper by turning it into and on itself so that it will form a helix within the interior of the mandrel which helix runs in the opposite direction to the helix formed by the wrapper portion 444a on the exterior surface of the mandrel. The interior spirally wound portion of the wrapper designated in FIG. 30 by the reference character 444b extends through the rotating tube 396 that is disposed within the mandrel, and the purpose of the tube 396 is primarily to support the finger 448 and to rotate it relative to the formed pipe to accomplish the stripping action. It will therefore be seen that the purpose of the fixed mandrel tube 392 which is concentric with and just outside of the rotatable mandrel tube is to isolate the rotatable mandrel tube from the returning portion of the chains 400 whereby to prevent the rotation of the rotating tube interfering with the movement of the chains. The interior spirally wound portion 444b of the wrapper 444 extends through the entire length of the rotatable mandrel tube 396 and passes out through the left hand end of said tube (FIG. 12) where it is guided onto a drive roller 452 which is driven in a manner to be described hereinafter. Wrapper passes around substantially 270° of circumference of the drive roller 452 and is held in contact with said roller for such a great angular distance by a guide roller 454 which is mounted on a pivoted crank 456. The wrapper 444 passes around the under portion of the roller 454 and thence upwardly and around the upper portion of a roller 458 mounted on the opposite end of the crank 456. After passing around the upper portion of the roller 458 the wrapper 444 will pass around a guide roller 460 and thence down over the outer surface of the sleeve 370 to a slot in the flange 360 of the rotatable sleeve 362. Thence the wrapper 444 passes around guide means 462 within the housing 304 and thence out of the housing through a slot 464 in a rotatable plate 466 attached to the sleeve 362. Passing out through the slot 464, the wrapper 444 moves over a guide roller 468, thence over a second guide roller 470, and thence over a feed roller 472 which is pivotally mounted as by a pivot 474 on a bracket 376 fixed to the rotatable plate 466. From the feed roller 472 the wrapper 444 is fed back onto the outer surface of the mandrel in overlying relation with the conveyor elements 400 as was heretofore described.

It will be noted that the final roller 472 encountered by wrapper 444 hereinbefore designated at the feed roller, is pivotally mounted. The purpose of this is to insure the proper lead angle for the feeding of the wrapper 444 onto the mandrel so that the proper degree of helix will result to yield a helix that has slightly spaced apart convolutions in non-overlapping relation.

As hereinbefore described the drive roller for the wrapper 444 is the roller 452 adjacent the extreme left hand end of the mechanism as seen in FIG. 12. Another view of the drive roller 452 may be seen in FIG. 25. The drive roller 452 is rotatably mounted on a rotatable shaft 456 with a suitable clutch mechanism (not shown) interposed between the roller and the shaft to vary the amount of torque imparted to the roller by the shaft. Fixed to the shaft 456 for rotation therewith in a bevel gear 458 which is in meshed relation with a bevel gear 460 mounted on a shaft 462. The manner of connection of the shaft 462 to the bevel gear 460 is by way of a conventional knuckle joint for reasons which will become apparent hereinafter. At the other end of shaft 462 there is another knuckle joint 464 which connects the shaft 462 to a shaft 466. It will be apparent therefore that the shaft 462 is connected to the shaft 466 at an angle therewith and that the shaft 462 is connected to the bevel gear 460 at an angle to its axis of rotation. For these reasons the knuckle couplings at opposite ends of the shaft 462 are required to compensate for the angular differences. It is also desirable to employ two knuckle joints at opposite ends of the shaft 462 in order to smooth out the operation thereof, which operation, if only one knuckle joint were employed, would tend to be somewhat erratic or jerky. The shaft 466 is journaled in a bearing connected to the disc 372 and, accordingly, is rotatable therewith about the central axis of the machine. Fixed to the shaft 466 is a spur gear 468 which is in meshed relation with a spur gear 470 that is mounted on a shaft 472 which extends substantially the full length of the sleeve 370 and carries at its other end a spur gear 474 which is in meshed relation with a companion gear 476 (see FIG. 22). Gear 476 is in turn in meshed relation with a ring gear 478 which is fixed to the mandrel sleeve 382 and, therefore, is not rotatable. Hence, rotation of the shaft 472 is a result of the fact that the shaft 472 will be carried around the central axis of the machine 300 by the disc 372 which is rotatable with the sleeve 370 and in revolving about said central axis in meshed relation with the stationary ring gear 478 rotation will be imparted to gear 474. This rotation of the gear 474 will rotate shaft 472 which will in turn impart rotation through the gear train 468—470 to the shaft 462 to thereby drive the drive roller 452. In this manner linear longitudinal movement is imparted to the wrapper 444.

As was indicated earlier in this description, the amount of torque imparted to the drive roller 452 by the shaft 456 is by virtue of a variable clutch such as a disc clutch and the variation thereof is effected by turning a thumb screw 480 which tends to move the shaft 456 toward and away from the roller 452 to thereby increase and decrease the friction between adjacent discs in a conventional disc clutch. In this manner the amount of torque may be varied to thereby vary the amount of tension on the wrapper 444.

The tension on the wrapper 444 is also partially controlled by the arrangement of the pivoted crank 456 and the rollers 454 and 458 on the ends thereof. The roller 454 is adapted to bear against the surface of the roller 452 with the wrapper 444 passing downwardly between the two rollers 452 and 454. Should the tension on the wrapper 444 commence to increase there would be a tendency for the wrapper to slip on the surface of the roller 452. However, with the arrangement as shown in FIG. 12 as the tension of the wrapper 444 increases the crank 456 tends to pivot in a clockwise direction to thereby hold the wrapper 444 more securely against the surface of the roller 452 to thereby prevent such slippage. In this way tension on the wrapper 444 is further controlled.

Turning our attention now to the optional auxiliary continuous wrapper 446, this wrapper follows substantially an identical path to the wrapper 444 and employs substantially identical mechanisms for wrapping it on the mandrel, for taking it off the mandrel, and for imparting linear movement to it. Briefly, the portion designated in FIG. 30 by the reference character 446a is spirally wound in bridging relation to the spaces between the convolutions of the wrapper portion 444a. This spirally wound portion 446a of the auxiliary continuous wrapper 446 extends beyond the end of the mandrel to a rotatable finger fixture 482 which is secured to the mandrel tube 396 and rotates therewith. The finger 482 strips the auxiliary continuous wrapper 446 from the interior surface of the pipe formed by the machine and guides the wrapper in a path that winds it back on itself in a reverse helix, which helix is formed of smaller diameter than the interior helix of the wrapper 444. This portion of wrapper 446 is designated 446b. It will be seen that the reverse movement of the wrapper portion 446b will be within the interior of the spirally wound reversely directed wrapper portion 444a. The auxiliary continuous wrapper thereafter progresses from right to left along the mandrel through the center thereof, until it clears the left hand end of the sleeve 386 where it is guided onto its drive roller 484 which is a direct counterpart of the guide roller 452 for the wrapper 444. The drive roller 484 has the wrapper 446 wrapped around it substantially 270° and it passes downwardly between the drive roller 484 and a guide roller 486 which is mounted on a pivoted crank 488 having another guide roller 490 at its opposite end. The wrapper 446 passes down around the guide roller 486 and thence upwardly and over the top of the guide roller 490 and thence over a roller 492 (see FIG. 12). Auxiliary continuous wrapper 446 then passes over the outer surface of the sleeve 370 and through a slot into the interior of the housing 304. The passage through said housing is defined by rigid guide means (not shown) similar to the guide means 462. Wrapper 446 then passes out of housing 304 through a slot in the plate 466 which slot is designated by the reference character 494. The wrapper 446 then passes over a first guide roller 496, down under a second guide roller 498 and thence over a feed roller 500 which is pivotally mounted as at 502 on a bracket 504. The pivotal mounting of the feed roller 500 is to insure that when the auxiliary wrapper is fed onto the mandrel 376 it is at the proper angle relative to the mandrel and relative to the helix windings of the wrapper 444.

To supply motor power to the drive roller 484 for the auxiliary wrapper 446 a belt 506 is employed. The belt 506 extends around a pulley 508 mounted on the shaft 456 and the belt 506 also extends around a second pulley 510 mounted on a shaft 512 which is supported in a suitable bracket 514. Also secured to the shaft 512 in rotatable relation therewith is another pulley 516 which may have torque imparted thereto by the rotatable shaft 512 in accordance with the condition of a disc clutch (not shown) which clutch is adjustable by means of a thumb screw 518. The pulley 516 has in frictional engagement therewith a belt 520 which runs around a second pulley 522 that is mounted on the shaft of the drive roller 484. Thus, the torque to the drive roller 484 is readily adjustable in a manner similar to that employed in adjusting the torque to the drive roller 452. It will also be seen that the entire drive mechanism for the wrapper 444 and the auxiliary wrapper 446 is supported on the machine by a suitable bracket means herein generally designated by the reference character 524.

The mechanism for insuring that the mandrel and associated so-called stationary sleeves and tubes will not rotate includes a pair of gears 477 which are in meshed relation with the gears 476. The gears 477 are fixed on rotatable shafts 479 which are journaled in bearings 481 carried by the sleeve 362. On the right hand end of the shaft 479 are fixed gears 483 which are in meshed relation with an internal ring gear 485 which is fixed to the stationary sleeve 364. The ratio of the various gears 477, 483 and 485 are selected so that as the rotatable sleeve 362 rotates about the mandrel 376, the gear 483 will roll within the internal ring gear 485 to cause the shaft 479 to rotate and thereby turn the gear 477. With the gear 477 turning it will impart rotation to the gear 476 and thereby cause it to move around the ring gear 478 and thus maintain the ring gear 478 stationary. As the ring gear 478 is secured to the stationary sleeve 382, it insures that sleeve 382 and portions connected therewith (including the mandrel 376) will be held against possible rotation resulting from drag in the bearings. Thus the gearing arrangement including the gears 474, 477, 483 and 485 together with the shafts 479 act to maintain stationary those portions of the machine which have heretofore been described as stationary but which are out of direct securement with the housing or base.

The description of the mandrel, the parts intimately connected therewith, and the motor means therefor is substantially completed hereinabove. Such a description in short describes a stationary mandrel having longitudinally movable conveyor elements running along the outer surface thereof and spirally wound wrapper means overlying the conveyor elements to form a substantially continuous longitudinally movable pipe forming surface on the outer part of the mandrel.

In order to form a suitable pipe on such a device means must be provided for winding in a helical fashion one or more plies or layers of pipe forming material thereon. As presently preferred the pipe forming material is a plastic impregnated fiberglass tape. Most preferably, the material is a multiplicity of strands of substantially parallel glass fibers which have substantially uniformly dispersed there-throughout partially cured plastic material. It is presently preferred to employ resins which are generally liquid in their A stage, tacky dry in their B stage and when substantially heated go into an irreversible C stage which forms the finished product. When such a resin is employed it is preferred that the resin be B staged before the material is put on the machine whereby only heat treatment to convert it to C stage will be necessary. However, if desired, the resin may be employed to impregnate the parallel glass fibers and the solvent may be driven off in which event it will be in substantially a semi-dry A stage. In lieu thereof a non-impregnated tape might be employed and the resin in an A stage may be applied thereto as suggested with respect to the first embodiment of the invention described in this application and which was illustrated in FIGS. 1 through 11. Moreover, a wide variety of resins may be employed in connection with this invention and the resins may be either thermoplastic or thermosetting. As is presently contemplated, among the resins which are highly desirable for use in connection with this invention are epoxy resins, polyester resins and phenolic resins. However, this invention is not to be limited in any way by the type of resin which is employed in the finished product.

As described hereinbefore, the preferred form of material to be used on the machine 300 is a preimpregnated fiberglass roving in which all of the fibers are substantially parallel. Such a product is commercially available and may be obtained on fairly large diameter spools with many feet of preimpregnated material while thereon. Generally speaking, such a spool of preimpregnated material comes with an interleaving of treated paper wound between adjacent convolutions of the preimpregnated material to prevent adhesion between such adjacent convolutions. As will be seen hereinafter means are provided for stripping said interleaving liner from the spool as material is removed therefrom in a manner to be described. Naturally, if such interleaving is not required for the particular type of preimpregnated material, the means for removing the interleaving may be deleted.

The means for feeding the preimpregnated material on to the outer surface of the spirally wound wrapper portions 444a and 446a are shown in FIGS. 12, 15, and 27 through 29, and reference to these figures will be made in the ensuing description. As shown herein, and as is presently preferred, a number of material feeding stations are provided, herein designated in FIG. 12 and FIG. 13 as stations 526, 528, 530 and 532. Each of these stations is substantially identical to each other and so reference will be had to station 526, it being understood that the other stations are identical. In order to spirally wrap preimpregnated material 534 onto the pipe forming surface made up of the wrapper portions 444a and 446a, it is necessary to wind the material 534 around the mandrel. This is accomplished by providing at each station a rotating disc 536 which is coupled by any suitable means such as nuts and bolts to a sprocket 538 that floats on four notched groove rollers 540 which are secured to stationary upstanding support means 542 (see FIG. 23). The sprocket 538 is readily rotatable due to its riding within the grooves of the groove rollers 540. Extending around the toothed outer surface of the sprocket 538 is a chain 544 which extends downwardly and about a drive sprocket 546 mounted on a rotating shaft 548. The shaft 548 has fixed thereto a gear 550 which is in meshed relation with a gear 552 that is carried by the line shaft 554. The line shaft 554, which is supported by a number of bearing members 556 secured to the base 302 of the machine has fixed to its left hand end adjacent motor 306 a sprocket 558. Extending around the sprocket 558 is a chain 560 which also passes around a sprocket 562 secured to the shaft 352. The shaft 352, as will be recalled from earlier description, is driven by the shiftable gear cluster 332. Hence a shift in gear ratio by movement of gear cluster 332 will alter the speeds of movement and rotation of all critical portions of machine 300. An independent method of changing the speed of wrapping the material 534 on the pipe forming surface is to change the gear ratio between the gear 550 and 552 and for this purpose it is desirable to make these gears readily changeable by employing so-called change gears for this purpose. Naturally, in lieu of the use of the change gears 550—552 a variable speed drive could be employed.

Figure 15:
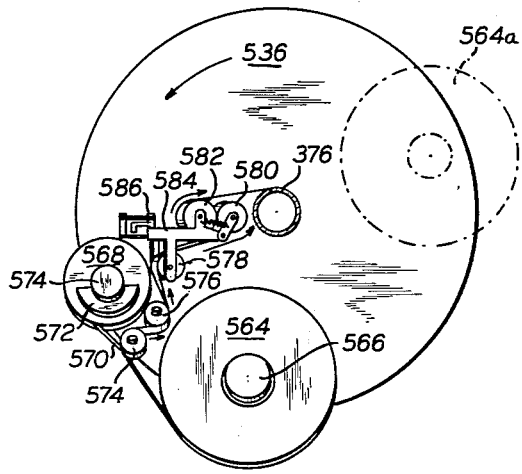
Figure 16:
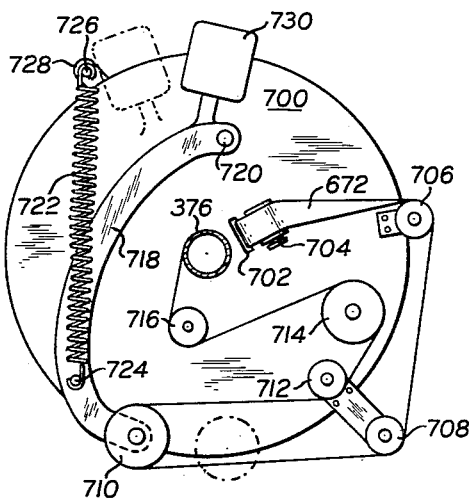

Referring particularly to FIG. 15, the spool of preimpregnated material with interleaving material wound therewith is designated by the reference character 564. Spool 564 is rotatably mounted on disc 536 so that when disc 536 rotates in the direction shown, the material is stripped off of the spool 564 and causes the spool to rotate in a clockwise direction about a fixed axis of rotation 566 with both the material and the interleave coming off and the interleave being to the left of the material. The interleave is fed directly onto a spool 568 where it is wound up. The manner of rotating the spol 568 to take up the interleaving material 570 is accomplished by an offcenter weight 572 which is secured to the spool 568 through a suitable friction slippage device. The weight 572 always depends from the axis of rotation of the spool regardless of the angular position of the disc 536. Accordingly, as the disc 536 rotates, the fixed orientation of offcenter weight 572 will cause the spool 568 to rotate and thereby take up the interleaving material 570.

The preimpregnated plastic fiberglass tape or roving 534, after having been separated from the interleaving material 570, passes around three guide rollers 574, 576 and 578 as indicated by the arrows in FIG. 15. After passing over the guide roller 578 the material 534 will pass under and around the roller 580 biased by springs 600 into engagement with roller 582 and thence between said roller and its adjacent roller 582. Spring biased roller 580 serves to limit slippage of material 534 and hence to control tension on the material. From the roller 582 which serves as a feed roller, the material will pass onto the mandrel 376. Naturally, it will be understood that the disc 536 is constantly rotating with respect to the longitudinal axis of the mandrel 376 whereby to wind the material 534 in a helix onto the longitudinally movable pipe forming surface. It will be seen that the rollers 580 and 582 are mounted on a bracket 584 which is pivotally mounted as at 586. The pivotal connection 586 connects the bracket 584 to another bracket 588 which is in turn pivotally connected as at 590 to the disc 536. The pivotal connection 586 is included to insure the proper orientation of the feed roller 582 with respect to the mandrel in order to have the proper helical formation of the material 534 on the pipe forming surface of the mandrel. The pivotal connection 590 forms a part of a tension indicating mechanism. In order to be sure that there is adequate tension on the material 534 as it passes from the roller 582 to the pipe forming surface of the mandrel, the bracket 588 is pivoted as at 590 and is free to move outwardly from the disc 536 against the bias of a compression spring 592 which compression spring is adjustable by means of a thumb screw 594. When proper adjustment is made and proper tension is on the preimpregnated material 534, the bracket 588 would pivot against the compression spring 592 to thereby yield a visual indication of tension. This indication could be converted into an electrical indication by the incorporation of suitable microswitches.

To compensate for the weight of the various mechanisms in the preimpregnated feed mechanism being described immediately above, several counterweights are provided, the first of these is designated by the reference numeral 596 and serves as a means of countering the weight of the rollers 582 and 580 as well as its supporting bracket 584. A second counterweight 598 is provided at the end of the bracket 588 to compensate for the weight of the rollers 580 and 582, their bracket 584 as well as the bracket 588 itself and the counterweight 596. In this manner the mass of these components is cancelled out and has no effect upon the spring tensions and other forces necessary to the operation of the machine.

As indicated hereinbefore the tension on the material 534 as it is fed to the pipe forming surface of the mandrel is critical in that the properties of the pipe are substantially dependent thereon. Accordingly, means are incorporated in the roller 582 for adjusting said tension. This means is illustrated in FIG. 29. Referring now to FIG. 29, a spool 602 is disposed within the outside of the roller 582 and is secured thereto. The spool has in effect two end plates 604 and 606 and a center cylinder 608. Disposed within the center cylinder 608 are bearings 610 which ride on a shaft 612 which is fixed at one end to a portion of the bracket 584. The shaft 612 is provided with a shoulder 614 and disposed between the shoulder and the end plate 606 of the spool 602 is a washer 616 preferably made of high friction material such as leather or rubber. A similar washer 618 bears against the opposite end plate 604 of the spool 602 and is held in bearing relation by a compression spring 620 which surrounds a threaded portion 622 of the shaft 612. Threadedly mounted on the threaded portion 622 is a movable bearing plate 624 which is in engagement with the spring 620. By rotating the bearing plate 624 it may be shifted longitudinally of the shaft 612—622 to thereby increase or decrease the compression on spring 620. As the spring compression increases the intimacy of the engagement of the washer with the spool also increases. Accordingly, the tension on the preimpregnated material 534 may be adjusted by adjusting the compression on the spring of 620.

Figure 25:
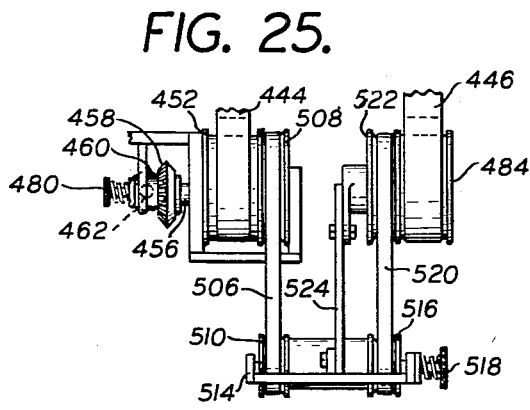
Figure 26:
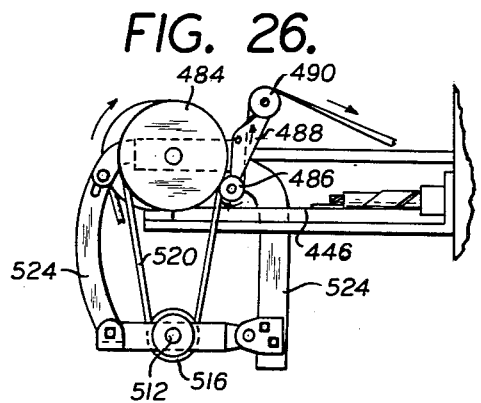

It might be noted that the structure illustrated in FIG. 29 is substantially similar to the means for adjusting tension in FIG. 25 with respect to the drive rollers 452 and 484.

In accordance with the presently preferred form of the invention it is desired to wrap a number of plies of preimpregnated fiberglass roving on the pipe forming surface with a portion of the pipe material extending in a right hand helix around the pipe forming surface and another portion of material extending in a left hand helix therearound. In order to accomplish this it is necessary for some of the discs 536 at the various stations 526, 528, 530, 532, to rotate in one direction and other of the discs to rotate in the opposite direction in order to wrap the preimpregnated material on the spools 564 carried by the discs 536 in opposed and superposed helixes on the mandrel. As shown in herein the discs 536 at stations 526 and 530 rotate in one direction and discs 536 at stations 528 and 532 rotate in the opposite direction whereby to yield alternate left hand helical and right hand helical plies or layers of material.

At times it is found that the material 534 will not lie absolutely flat on the pipe forming surface due to inherent stiffness of the material resulting usually from the resin impregnant. To overcome this, mild heating of the material is often desired. The preferred form of supplying mild heat to the material 534 is by means of electrical heating of the mandrel itself. This is accomplished by laying in grooves in the outer surface of the mandrel 376 small wire heater elements 626 disposed along the outer of the mandrel 376 in longitudinally extending direction (see FIG. 12). The wire heater elements are preferably disposed in small grooves in the mandrel surface so that they do not interfere with the operation of the conveyor elements although they may be placed in the spaces between adjacent conveyor elements. As indicated hereinbefore the heater elements are preferably electrically energized. Accordingly the heater wires connected to the heater element 626 must extend back along the surface of mandrel 376 into the area of the sleeve 362. These wires are designated in FIG. 18 by the reference numeral 628. In the area between the left-most rotating plate 466 and the center of the sleeve 362 heater wire is not employed but instead a low resistance wire is employed to reduce losses in the area where heat is not necessary. The wires 628 are attached to suitable connector blocks 630 which have extending upwardly therefrom slip rings 632. The slip rings 632 are in sliding engagement with brushes 634 which are secured to rotatable sleeve 362. The brushes 634 have a conductive connector means 636 extending from them upwardly through the sleeve 362 to slip rings 638 which are in sliding engagement with brushes 640 secured to the stationary sleeve portion 364. Electrically connected to the brushes 640 are leads 642 which extend to a suitable source of electrical energy. In this way heating energy can be brought into the mandrel surface without interfering with the conveyor elements, the wrappers which make the pipe support and the laying of the preimpregnated material on the pipe forming surface.

Figure 19:
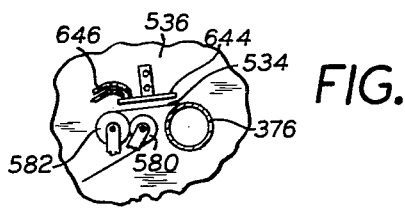
Figure 24:
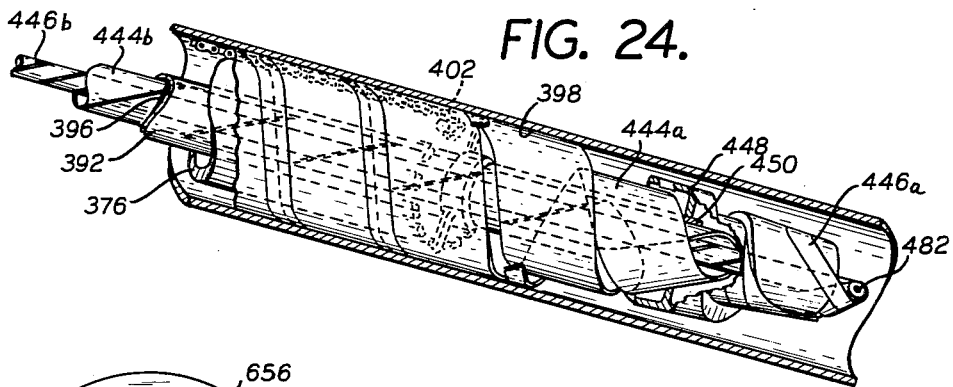

An alternative means of supplying mild heat to the material 534 so as to cause it to lay properly on the mandrel is shown in FIG. 19. In this illustration suitable plate heaters 644 are provided in closely spaced relation to the preimpregnated material just as it is about to be disposed on the mandrel from the tensioning roller 582. This will heat the material 534 sufficiently to give a reasonably good orientation and disposition of the material on the mandrel pipe forming surface. Naturally, the heater 644 is preferably an electric heater and suitable wires coming from a power source must be included. These wires are designated by the reference character 646 and have to be brought to the plate 536 on which they are mounted through a suitable slip ring arrangement.

The foregoing description of the now preferred embodiment of the invention has proceeded to the point where the preimpregnated fiberglass material has been wrapped onto the mandrel as shown in FIG. 13 and the right hand end of FIG. 12. However, it is necessary now to cure the resin with which the material 534 is pre-impregnated so that a substantially homogeneous pipe will result. In order to do this some suitable heating means must be employed. Any type of heating will be satisfactory for this purpose such as, for instance, dielectric heating. However, as shown herein a conventional electric oven is provided.

Figure 21:
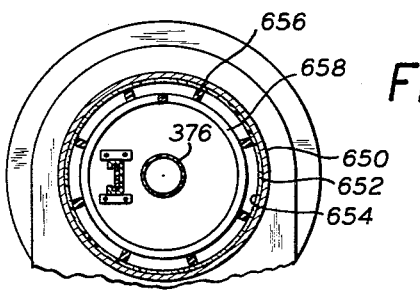

The oven is shown in the drawings best in FIGS. 13 and 21. The oven is generally designated by the reference numeral 648. The oven 648 has a substantially cylindrical outer casing 650. Immediately inside the casing 650 is a suitable thermal insulator 652 and then another inner casing 654 preferably made of metal. This assembly 650, 652, 654 provides a satisfactory heat barrier for preventing substantial heat losses. Secured to the inner wall 654 of the oven 648 are a number of electrical insulators or bushings 656 which have extending between them a wire heating element 658. The wire heating element may be arranged in any satisfactory array to give substantially uniform heat throughout. For instance it may be in a spiral, or it may be criss-crossed back and forth, or any other suitable array. The wires are in spaced relation to the mandrel 376. It will be seen that the oven 648 is stationary and non-rotatable and is supported on the base 302 by suitable upstanding support members 660. At both the left and right hand ends of the oven 648 are provided closures 662 and 664 for preventing substantial heat losses through the ends. Naturally, each of these closures is provided with a central opening to permit the passage of the pipe therethrough. To enhance the uniformity of heating of the pipe within the oven 648 and to remove any undesired fumes evolved as a result of the curing of the resin within the oven, an air circulating means is provided. As shown herein the oven has an air intake 666 and an air outlet or exhaust 668 the latter of which is connected to a blower 670. The temperature within the oven is adjustable in accordance with the type of resin impregnant employed in the material 534 and in accordance with the length of the oven. Naturally the curing of most resins is dependent on a time-temperature relationship and the longer the oven the lower the temperature can be. Of course, there are minimum and maximum curing temperatures for every resin and the oven should never be heated below or above the minimum and maximum curing temperatures for the particular resin impregnate being employed.

Figure 17:
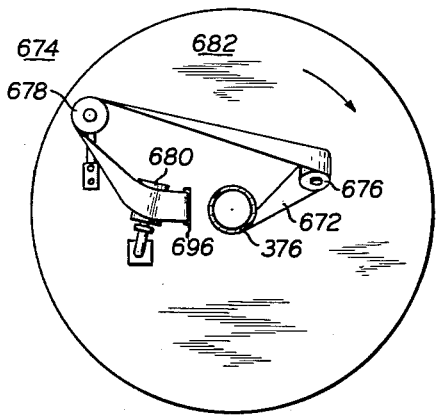

It has been found desirable prior to the curing of the pipe formed on the machine to enclose it with an outer wrapper means so as to insure a uniformity of disposition of the material 534 on the mandrel and to apply some pressure to the material during the curing. This is done by the application of an outside wrapper 672 which is placed onto the pipe between the last or right-most station 532 which completes the formation of the plies of preimpregnated material 534 and the entrance of the pipe into the oven 648. The outside wrapper is spirally wound about the outermost ply or layer of material 534 through the entire length of the oven and slightly beyond to a station 674 just to the right of the oven as viewed in FIG. 13 where it is stripped from the pipe. The manner of stripping the outer wrapper 672 from the pipe at the station 674 is illustrated in FIG. 17. Referring now to FIG. 17 it will be seen that at station 674 the wrapper leads off the mandrel 376 to a roller 676, thence over said roller and around a second roller 678 and thence downwardly to still a third guide roller 680. Each of the rollers 676, 678, 680 are mounted on a disc 682 which rotates in a clockwise direction as viewed in FIG. 17. The manner of rotating the disc 682 is precisely the same as that employed for rotating the disc 536 for wrapping the material 534 on the mandrel. That is, a sprocket 684 which is secured to the plate 682 rides in a plurality of grooved rollers 686, the sprocket being connected by means of a chain 688 to a sprocket 690 mounted on a shaft 692 which is in driven relation with the line shaft 554, the driving mechanism being a chain and sprocket arrangement 694. It will be obvious that it is necessary to rotate the guide rollers 676, 678, 680 in order to in fact strip the outer wrapper 672 from the outer surface of the now formed pipe. After having passed around the rollers the wrapper 672 will pass through a slot 696 in the rotatable plate 682 and thence into a channel 698 which extends through the length of the oven and rotates with the plate 682. At the left hand end of the channel 698, as viewed in FIG. 13, it is secured to a second rotatable disc or plate 700 which disc is rotatable in the same direction and at the same rate as disc 682. Accordingly, the outer wrapper 672 can pass along through the channel and then through a slot 702 in the disc 700 as may best be seen in FIG. 16. After passing through the slot 702 which is in registry with the channel member 698, the wrapper 672 leaves the channel and goes around a first guide roller 704, a second guide roller 706, a third guide roller 708 and a tensioning roller 710 which operates in a manner to be described hereinafter. After passing around the tensioning roller 710 the wrapper 672 will pass around three additional guide rollers 712, 714 and 716 and thence back on to the mandrel 376, The tensioning roller 710 is provided to insure proper tension on the outer wrapper 672 as it is being applied to the outer surface of the pipe to be formed. This tension is of some critical importance in that pressure on the pipe during curing is a desirable feature. Furthermore, by employing the tensioning roller 710 the device can be used with respect to varying thicknesses of pipe without having to change the outer wrapper feed structure. In order to apply tension through the tensioning roller the roller 710 is rotatably mounted on arcuate lever 718 which is pivoted at 720. The lever 718 is subjected to a substantial spring force by a tension spring 722 which is secured at one end to a lug 724 on the lever 718 and is secured at its other end to a lug 726 on an upstanding portion 728 fixed to the rotating disc 700. In order to provide a substantially rugged construction, the weight of the tensioning roller and the lever arm is quite large which weight tends to overstress the spring 722. However, in order to avoid this overstressing, a suitable counterweight 730 is provided which acts on the lever in a direction opposite to the weight of the center of gravity of the lever itself. Naturally, as tension increases on the wrapper 672 the lever will tend to pivot in a counterclockwise direction from the solid line shown in FIG. 16 to the dotted position shown therein. This will tend to relieve some of the tension and hence maintain it at a fairly uniform rate.

In operation when the motor is actuated, it will actuate the drive mechanism contained within the housing 304 to thereby start rotating the rotatable sleeves and maintaining in a non-rotatable fashion the mandrel and parts associated therewith. The rotation of the rotatable sleeves will impart through suitable gear mechanisms linear movement to the conveyor elements or chains 400 which conveyor elements will impart linear movement to the wrapper means 442. Naturally, in order to permit the wrapper means to be continuous it must be returned through the center of the mandrel and the necessary drive for returning this is provided by the drive rollers 452 and 454. One or more layers of plastic impregnated fiberglass tape are spirally wound on the moving tube forming surface by suitable rotating feed rollers 582 and other mechanism associated with the rotating disc 536. This puts the raw pipe forming material on the moving mandrel so that it may move into the oven 648 where the resin may be fully cured. If desired and as presently preferred just prior to moving the spirally wound pipe forming material into the oven, an outer wrapper 672 is wound onto the outer surface of the material to be formed into a pipe in order to smooth out said material and in order to apply a curing pressure thereto. After the pipe has passed through the oven and has been fully cured it continues to move longitudinally of the mandrel whereas the conveyor elements are turned around the end of the mandrel and moved back through the center of the mandrel and the wrapper means 442 is stripped of the inner surface of the now formed pipe and returned back through the center of the mandrel to be refed another time.

If desired the pipe after being formed on the mandrel may be passed through a second oven for a post-curing process. This generally improves the property of the pipe and is therefore desirable. However, it has been found that in order to gain maximum benefits of the post-during operation it is desirable to retain the auxiliary wrapper portion 446 within the interior of the pipe until the postcuring is accomplished. Accordingly, if postcuring is to be done on a continuous basis in direct coupling with the machine 300, it will be desirable not to strip the auxiliary wrapper 446 from the interior of the pipe at the end of the mandrel but to permit it to move off the mandrel together with the pipe and through the postcuring oven at which point it may be stripped off the end of the interior of the pipe wound back on itself and returned down through the interior of the pipe in spaced relation therewith and then back through the interior of the mandrel so as to maintain its continuous nature.

In the alternative the auxiliary wrapper 446 may be made of a material which will form an integral portion of the interior of the pipe which in event the auxiliary wrapper will not be a continuous wrapper in the sense of it being returned for future passes through the machine. In such an event the auxiliary wrapper will be fed onto the mandrel in the manner described but during the curing operation in the oven 648 it will adhere to the inferior surface of the pipe and will actually form an integral part thereof. Thereafter when the pipe moves off the mandrel to the post-curing oven the auxiliary wrapper will cease to form the function of a wrapper and will thereafter be considered as part of the finished product.

While we have herein shown and described the preferred form of the present invention and have suggested various modifications therein, other changes and modifications may be made therein the scope of the appended claims without departing from the spirit and scope of this invention.

What we claim is:

1. In apparatus for making tape reiforced plastic pipe, a mandrel comprising a longitudinally extending member, a plurality of circumferentially spaced continuous conveyor elements each having a portion overlying the outer surface of said tubular member and another portion extending through said tubular member, each of said conveyor elements being movable longitudinally of said tubular member, and spirally wound wrapper means on said tubular member in overlying relation with a part at least of the portion of the conveyor elements overlying the outer surface of said tubular member, whereby when said conveyor elements move longitudinally of said tubular member said spirally wound wrapper moves therewith to thereby form a longitudinally movable pipe forming surface, said spirally wound wrapper means including a first spirally wound wrapper having adjacent convolutions in spaced relation and a second spirally wound wrapper having its convolutions bridging the spaces between adjacent convolutions of said first wrapper.

2. In apparatus for making tape reinforced plastic pipe, a mandrel comprising a longitudinally extending tubular member, a plurality of circumferentially spaced continuous conveyor elements each having a portion overlying the outer surface of said tubular member and another portion extending through said tubular member, each of said conveyor elements being movable longitudinally of said tubular member, and spirally wound wrapper means on said tubular member in overlying relation with a part at least of the portion of the conveyor elements overlying the outer surface of said tubular member, said wrapper means including a continuous wrapper having one portion spirally wound in overlying relation with said conveyor elements with the adjacent convolutions of said portion being in spaced relation and another portion extending through the interior of said tubular member, and another spirally wound wrapper having a portion thereof with convolutions which bridge the spaces between said adjacent spaced apart convolutions of said continuous wrapper.

3. In apparatus for making tape reinforced plastic pipe, a mandrel comprising a longitudinally extending tubular member, a plurality of circumferentially spaced continuous conveyor elements each having a portion overlying the outer surface of said tubular member and another portion extending through said tubular member, each of said conveyor elements being movable longitudinally of said tubular wrapper, and spirally wound wrapper means on said tubular member in overlying relation with a part at least of the portion of the conveyor elements overlying the outer surface of said tubular member, said wrapper means including a continuous wrapper having one portion spirally wound in overlying relation with said conveyor elements with the adjacent convolutions of said portion being in spaced relation and another portion extending through the interior of said tubular member, and a second continuous wrapper having a spirally wound portion with convolutions bridging the spaces between the adjacent spaced convolutions of said first mentioned wrapper and another portion extending through the interior of said tube.

4. In apparatus for making tape reinforced plastic pipe, a mandrel comprising a longitudinally extending non-rotatable tubular member supported adjacent one end thereof, a plurality of circumferentially spaced rollers disposed adjacent one end of said tubular member and being rotatable about axes extending transversely of the longitudinal axis of said tubular member, another set of circumferentially spaced rollers disposed adjacent the other end of said tubular member and being rotatable about axes extending transversely of the longitudinal axis of said tubular member, a plurality of continuous conveyor elements, one for each roller at one end of said tubular member, each of said conveyor elements being in operative relationship with a roller at each end and having a portion overlying the outer surface of said tubular member and another portion extending through said tubular member, drive means for imparting rotation to one set of rollers to impart longitudinal linear movement to said conveyor elements relative to said tubular member, continuous wrapper means having a portion spirally wound about the outer surface of said tubular member and part at least of the portions of said conveyor elements overlying said outer surface and engaging said parts of said conveyor elements for movement therewith, said wrapper means having another portion extending through said tubular member, the first mentioned portion of said wrapper means being adapted o provide a longitudinally movable pipe forming surface for the pipe to be made by the machine during the formation thereof, means for feeding pipe forming tape to said first mentioned portion of said wrapper means, and means for rotating said tape feeding means about said tubular member for winding said tape about said longitudinally movable first mentioned portion of said wrapper means to form said tape into a helix which forms a part of the pipe to be made which moves with said first mentioned portion of said wrapper means.

5. In apparatus for making tape reinforced plastic pipe, a mandrel comprising a longitudinally extending non-rotatable tubular member supported adjacent one end thereof, a plurality of circumferentially spaced rollers disposed adjacent one end of said tubular member and being rotatable about axes extending transversely of the longitudinal axis of said tubular member, another set of circumferentially spaced rollers disposed adjacent the other end of said tubular member and being rotatable about axes extending transversely of the longitudinal axis of said tubular member, a plurality of continuous conveyor elements, one for each roller at one end of said tubular member, each of said conveyor elements being in operative relationship with a roller at each end and having a portion overlying the outer surface of said tubular member and another portion extending through said tubular member, drive means for imparting rotation to one set of rollers to impart longitudinal linear movement to said conveyor elements relative to said tubular member, continuous wrapper means having a portion spirally wound about the outer surface of said tubular member and parts at least of the portions of said conveyor elements overlying said outer surface and engaging said parts of said conveyor elements for movement therewith, said wrapper means having another portion extending through said tubular member, the first mentioned portion of said wrapper means being adapted to provide a longitudinally movable pipe forming surface for the pipe to be made by the machine during the formation thereof, means for winding pipe forming tape onto said movable pipe forming surface in a given handed helix, another means for winding pipe forming tape onto said movable pipe forming surface in a helix opposite to said given handed helix and in superposed relation therewith.

6. In apparatus for making tape reinforced plastic pipe, a mandrel comprising a longitudinally extending non-rotatable tubular member supported adjacent one end thereof, a plurality of circumferentially spaced rollers disposed adjacent one end of said tubular member and being rotatable about axes extending transversely of the longitudinal axis of said tubular member, another set of circumferentially spaced rollers disposed adjacent the other end of said tubular member and being rotatable about axes extending transversely of the longitudinal axis of said tubular member, a plurality of continuous conveyor elements, one for each roller at one end of said tubular member, each of said conveyor elements being in operative relationship with a roller at each end and having a portion overlying the outer surface of said tubular member and another portion extending through said tubular member, drive means for imparting rotation to one set of rollers to impart longitudinal linear movement to said conveyor elements relative to said tubular member, continuous wrapper means having a portion spirally wound about the outer surface of said tubular member and part at least of the portions of conveyor elements overlying said outer surface and engaging said parts of said conveyor elements for movement therewith, said wrapper means having another portion extending through said tubular member, the first mentioned portion of said wrapper means being adapted to provide a longitudinally movable pipe forming surface for the pipe to be made by the machine during the formation thereof, means for feeding pipe forming tape to said first mentioned portion of said wrapper means, and means for rotating said tape feeding means about said tubular member for winding said tape about said longitudinally movable first mentioned portion of said wrapper means to form said tape into a helix which form a part of the pipe to be made which moves with said first mentioned portion of said wrapper means, and an outer removable wrapper having a helically wound portion concentric with and in spaced relation with said first mentioned portion of said continuous wrapper means, said helically wound portion of said outer removable wrapper being so spaced from said first mentioned portion of said continuous wrapper that said helically wound portion is adapted to be wound about the outer surface of said helically wound pipe forming tape to apply radial pressure thereto.

7. In apparatus for making tape reinforced plastic pipe, a mandrel comprising a longitudinally extending non-rotatable tubular member supported adjacent one end thereof, a plurality of circumferentially spaced rollers disposed adjacent one end of said tubular member and being rotatable about axes extending transversely of the longitudinal axis of said tubular member, another set of circumferentially spaced rollers disposed adjacent the other end of said tubular member and being rotatable about axes extending transversely of the longitudinal axis of said tubular member, a plurality of continuous conveyor elements, one for each roller at one end of said tubular member, each of said conveyor elements being in operative relationship with a roller at each end and having a portion overlying the outer surface of said tubular member and other portion extending through said tubular member, drive means for imparting rotation to one set of rollers to impart longitudinal linear movement to said conveyor elements relative to said tubular member, continuous wrapper means having a portion spirally wound about the outer surface of said tubular member and parts at least of the portions of said conveyor elements overlying said outer surface and engaging said parts of said conveyor elements for movement therewith, said wrapper means having another portion extending through said tubular member, the first mentioned portion of said wrapper means being adapted to provide a longitudinally movable pipe forming surface for the pipe to be made by the machine during the formation thereof, means for winding pipe forming tape onto said movable pipe forming surface in a given handed helix, another means for winding pipe forming tape onto said movable pipe forming surface in a helix opposite to said given handed helix and in superposed relation therewith, said opposed and superposed helixes moving together with said first mentioned portion of said wrapper means, and an outer removable wrapper having a helically wound portion concentric with and in spaced relation with said first mentioned portion of said continuous wrapper means, said helically wound portion of said outer removable wrapper being so spaced from said first mentioned portion of said continuous wrapper that said helically wound portion is adapted to be wound about the outer surface of said helically wound pipe forming tape to apply radial pressure thereto.

8. In apparatus for making tape reinforced plastic pipe, a mandrel comprising a longitudinally extending non-rotatable tubular member supported adjacent one end thereof, a plurality of circumferentially spaced rollers disposed adjacent one end of said tubular member and being rotatable about axes extending transversely of the longitudinal axis of said tubular member, another set of circumferentially spaced rollers disposed adjacent the other end of said tubular member and being rotatable about axes extending transversely of the longitudinal axis of said tubular member, a plurality of continuous conveyor elements, one for each roller at one end of said tubular member, each of said conveyor elements being in operative relationship with a roller at each end and having a portion overlying the outer surface of said tubular member and another portion extending through said tubular member, drive means for imparting rotation to one set of rollers to impart longitudinal linear movement to said conveyor elements relative to said tubular member, continuous wrapper means having a portion spirally wound about the outer surface of said tubular member and parts at least of the portions of said conveyor elements overlying said outer surface and engaging said parts of said conveyor elements for movement therewith, said wrapper means having another portion extending through said tubular member, the first mentioned portion of said wrapper means being adapted to provide a longitudinally movable pipe forming surface for the pipe to be made by the machine during the formation thereof, a plurality of means for feeding pipe forming tape to said first mentioned portion of said wrapper means, said tape feeding means being spaced longitudinally of said tubular member, and means for rotating said tape feeding means about said tubular member in opposite directions for winding said tape about said longitudinally movable first mentioned portion of said wrapper means to form a plurality of helixes, at least two of which are wound in opposite directions, and which are in superposed helical layers, and an outer removable wrapper having a helically wound portion concentric with and in spaced relation with said first mentioned portion of said continuous wrapper means, said helically wound portion of said outer removable wrapper being so spaced from said first mentioned portion of said continuous wrapper that said helically wound portion is adapted to be wound about the outer layer of said helically wound pipe forming tape to apply radial pressure thereto.

9. In apparatus for making tape reinforced plastic pipe, a mandrel comprising a longitudinally extending non-rotatable tubular member supported adjacent one end thereof, a plurality of circumferentially spaced rollers disposed adjacent one end of said tubular member and being rotatable about axes extending transversely of the longitudinal axis of said tubular member, another set of circumferentially spaced rollers disposed adjacent the other end of said tubular member and being rotatable about axes extending transversely of the longitudinal axis of said tubular member, a plurality of continuous conveyor elements, one for each roller at one end of said tubular member, each of said conveyor elements being in operative relationship with a roller at each end and having a portion overlying the outer surface of said tubular member and another portion extending through said tubular member, drive means for imparting rotation to one set of rollers to impart longitudinal linear movement to said conveyor elements relative to said tubular member, continuous wrapper means having a portion spirally wound about the outer surface of said tubular member and part at least of the portions of said conveyor elements overlying said outer surface and engaging said parts of said conveyor elements for movement therewith, said wrapper means having another portion extending through said tubular member, the first mentioned portion of said wrapper means being adapted to provide a longitudinally movable pipe forming surface for the pipe to be made by the machine during the formation thereof, a plurality of means for feeding pipe forming tape to said first mentioned portion of said wrapper means, said tape feeding means being spaced longitudinally of said tubular member, and means for rotating said tape feeding means about said tubular member in opposite directions for winding said tape about said longitudinally movable first mentioned portion of said wrapper means to form a plurality of helixes, at least two of which are wound in opposite directions, and which are in superposed helical layers, and an outer removable continuous wrapper means having a helically wound portion concentric with and in spaced relation with said first mentioned portion of said continuous wrapper means, said helically wound portion of said outer removable wrapper being so spaced from said first mentioned portion of said continuous wrapper that said helically wound portion is adapted to be wound about the outer layer of said helically wound pipe forming tape to apply radial pressure thereto.

10. In apparatus for making tape reinforced plastic pipe, a mandrel comprising a longitudinally extending non-rotatable tubular member supported adjacent one end thereof, a plurality of circumferentially spaced rollers disposed adjacent one end of said tubular member and being rotatable about axes extending transversely of the longitudinal axis of said tubular member, another set of circumferentially spaced rollers disposed adjacent the other end of said tubular member and being rotatable about axes extending transversely of the longitudinal axis of said tubular member, a plurality of continuous conveyor elements, one for each roller at one end of said tubular member, each of said conveyor elements being in operative relationship with a roller at each end and having a portion overlying the outer surface of said tubular member and another portion extending through said tubular member, drive means for imparting rotation to one set of rollers to impart longitudinal linear movement to said conveyor elements relative to said tubular member, continuous wrapper means having a portion spirally wound about the outer surface of said tubular member and parts at least of the portions of said conveyor elements overlying said outer surface and engaging said parts of said conveyor elements for movement therewith, said wrapper means having another portion extending through said tubular member, the first mentioned portion of said wrapper means being adapted to provide a longitudinally movable tube forming surface for the pipe to be made by the machine during the formatin thereof, means for winding a pipe forming fibrous tape impregnated with plastic onto said first mentioned portion of said continuous wrapper means in a given handed helix, another means for winding pipe forming fibrous tape impregnated with plastic onto said first mentioned portion of said continuous wrapper means in a helix opposite to said given handed helix and in superposed relation therewith, and an outer removable continuous wrapper means having a helically wound portion concentric with and in spaced relation with said first mentioned portion of said continuous wrapper means, said helically wound portion of said outer removable wrapper being so spaced from said first mentioned portion of said continuous wrapper that said helically wound portion is adapted to be wound about the outer layer of said helically wound pipe forming tape to apply radial pressure thereto, and means for heating said pipe forming tape sandwiched between said two wrapper means for curing said plastic.

References Cited in the file of this patent

UNITED STATES PATENTS

| | | |
|---|---|---|
| 1,985,997 | Kieran | Jan. 1, 1935 |
| 2,402,038 | Goldman et al. | June 11, 1946 |
| 2,723,705 | Collins | Nov. 15, 1955 |
| 2,828,239 | Fischer | Mar. 25, 1958 |

FOREIGN PATENTS

| | | |
|---|---|---|
| 101,041 | Germany | Jan. 26, 1899 |